United States Patent
Byun et al.

(10) Patent No.: US 12,532,242 B2
(45) Date of Patent: Jan. 20, 2026

(54) METHOD AND APPARATUS FOR MULTICAST AND BROADCAST SERVICE IN A WIRELESS COMMUNICATION SYSTEM

(71) Applicant: LG Electronics Inc., Seoul (KR)

(72) Inventors: Daewook Byun, Seoul (KR); Jian Xu, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 461 days.

(21) Appl. No.: 18/009,876

(22) PCT Filed: Jul. 14, 2021

(86) PCT No.: PCT/KR2021/009031
§ 371 (c)(1),
(2) Date: Dec. 12, 2022

(87) PCT Pub. No.: WO2022/015044
PCT Pub. Date: Jan. 20, 2022

(65) Prior Publication Data
US 2023/0292219 A1    Sep. 14, 2023

(30) Foreign Application Priority Data

Jul. 14, 2020  (KR) .................. 10-2020-0086950
Jul. 15, 2020  (KR) .................. 10-2020-0087760

(51) Int. Cl.
*H04W 76/00* (2018.01)
*H04W 40/24* (2009.01)
*H04W 76/40* (2018.01)

(52) U.S. Cl.
CPC ....... *H04W 40/248* (2013.01); *H04W 40/246* (2013.01); *H04W 76/40* (2018.02)

(58) Field of Classification Search
None
See application file for complete search history.

(56) References Cited

U.S. PATENT DOCUMENTS

| | | | |
|---|---|---|---|
| 8,146,125 | B2 | 3/2012 | Grinkemeyer et al. |
| 8,516,529 | B2 | 8/2013 | LaJoie et al. |
| (Continued) | | | |

FOREIGN PATENT DOCUMENTS

| | | |
|---|---|---|
| WO | WO2018009340 | 1/2018 |
| WO | WO2018204863 | 11/2018 |

OTHER PUBLICATIONS

3GPP TR 23.757 V0.4.0 (Jun. 2020).*
(Continued)

*Primary Examiner* — Abdelillah Elmejjarmi
(74) *Attorney, Agent, or Firm* — Fish & Richardson P.C.

(57) ABSTRACT

A method and apparatus for multicast and broadcast service in a wireless communication system is provided. A CU-UP of a RAN node receives, from a CU-CP of the RAN node, a first message to join a multicast group for a MB service. A CU-UP of a RAN node performs the MLD and/or IGMP Join procedure for the MB service indicated by the identity for the MB service along with an MB-UPF based on the LL MC address. A CU-UP of a RAN node transmits, to the CU-CP of the RAN node, a second message including a Join Complete Indication informing that joining the multicast group for the MB service is completed.

3 Claims, 15 Drawing Sheets

(56) References Cited

U.S. PATENT DOCUMENTS

| | | | | |
|---|---|---|---|---|
| 2023/0141637 A1* | 5/2023 | Wang | ............. | H04W 4/08 370/329 |
| 2023/0189364 A1* | 6/2023 | Diao | ............. | H04L 67/146 370/329 |
| 2023/0254666 A1* | 8/2023 | Qi | ............. | H04W 28/0268 370/329 |

OTHER PUBLICATIONS

3GPP, "3rd Generation Partnership Project; Technical Specification Group Services and System Aspects; Study on architectural enhancements for 5G multicast-broadcast services (Release 17)," TR 23.757 V0.4.0, Jun. 2020, 157 pages.

3GPP, "3rd Generation Partnership Project; Technical Specification Group Services and System Aspects; Group Communication System Enablers for LTE (GCSE_LTE); Stage 2 (Release 16)," TS 23.468 V16.0.0, Jul. 2020, 32 pages.

3GPP, "3rd Generation Partnership Project; Technical Specification Group Services and System Aspects; System architecture for the 5G System (5GS); Stage 2 (Release 16)," TS 23.501 V16.4.0, Mar. 2020, 430 pages.

3GPP, "3rd Generation Partnership Project; Technical Specification Group Radio Access Network; NG-RAN; E1 Application Protocol (E1AP) (Release 16)," TS 38.463 V16.1.1, Apr. 2020, 191 pages.

3GPP, "3rd Generation Partnership Project; Technical Specification Group Radio Access Network; NG-RAN; F1 application protocol (F1AP) (Release 16)," TS 38.473 V16.1.0, Mar. 2020, 240 pages.

3GPP, 3rd Generation Partnership Project; Technical Specification Group Radio Access Network; NG-RAN; Architecture description (Release 16), TS 38.401 V16.1.0, Mar. 2020, 50 pages.

Ericsson, "KI #1, Sol #2: Solution 2 update," S2-2003679, Presented at SA WG2 Meeting #139E, Electronic, Jun. 1-12, 2020, 12 pages.

* cited by examiner

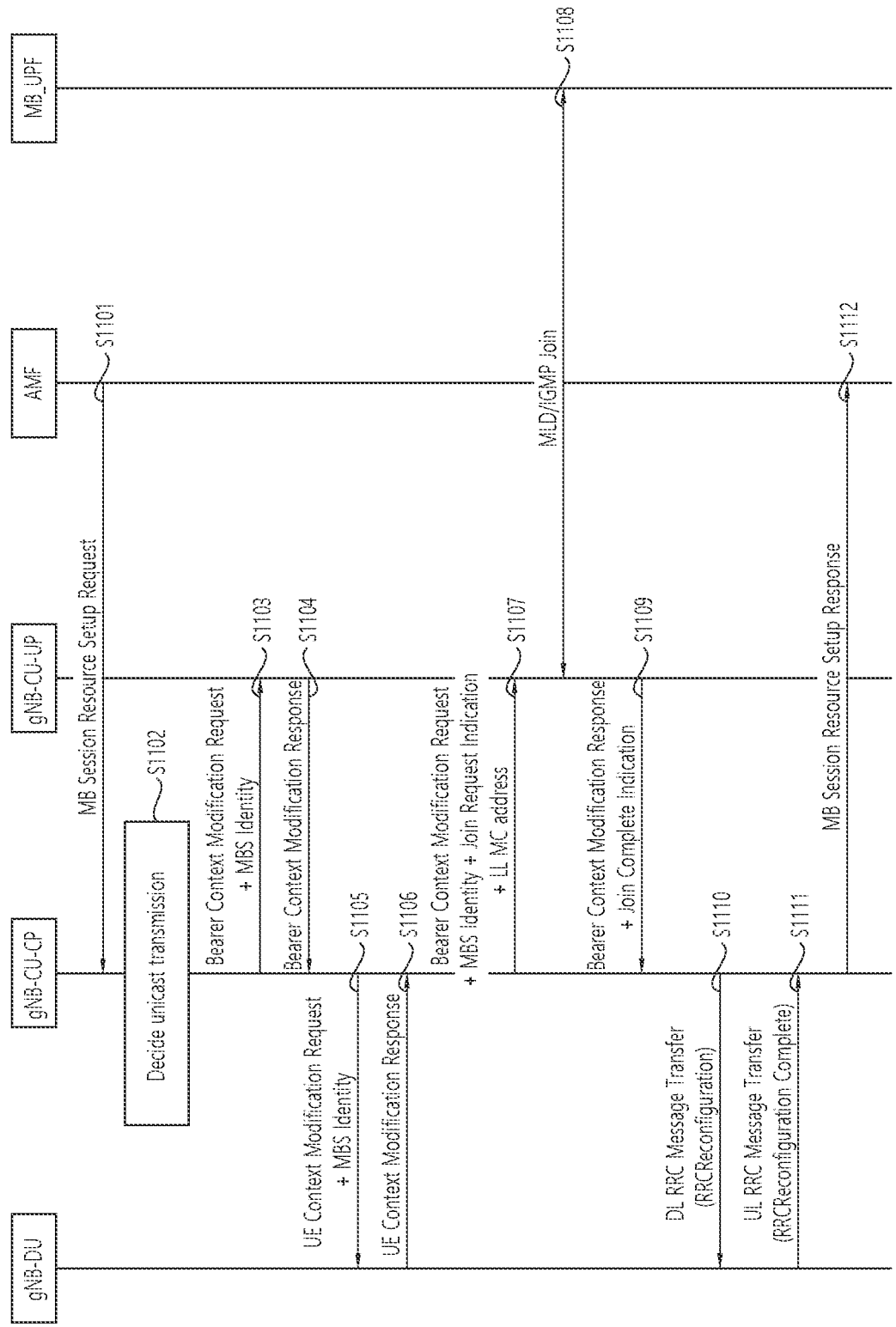

METHOD AND APPARATUS FOR MULTICAST AND BROADCAST SERVICE IN A WIRELESS COMMUNICATION SYSTEM

CROSS-REFERENCE TO RELATED APPLICATIONS

This application is a National Stage application under 35 U.S.C. § 371 of International Application No. PCT/KR2021/009031, filed on Jul. 14, 2021, which claims the benefit of Korean Patent Application No. 10-2020-0086950, filed on Jul. 14, 2020, and Korean Patent Application No. 10-2020-0087760, filed on Jul. 15, 2020. The disclosures of the prior applications are incorporated by reference in their entirety.

TECHNICAL FIELD

The present disclosure relates to a method and apparatus for multicast and broadcast service in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In NR, Multicast and Broadcast Services (MBS) may be supported.

For example, RAN basic functions may be support broadcast and/or multicast for UEs in RRC_CONNECTED state. For example, a group scheduling mechanism may be supported for UEs to receive Broadcast/Multicast service. In addition, the group scheduling mechanism may be supported to enable simultaneous operation with unicast reception. For example, dynamic change of Broadcast/Multicast service delivery between multicast (for example, Point to Multipoint (PTM)) and unicast (for example, Point to Point (PTP)) may be supported for service continuity for a given UE. For example, basic mobility may be supported for service continuity. For example, dynamic control of the Broadcast/Multicast transmission area within one Distributed Unit (DU) of a RAN node (for example, a gNodeB (gNB)) may be supported.

For example, RAN basic functions may be support for broadcast/multicast for UEs in RRC_IDLE/RRC_INACTIVE states. For example, Point to Multipoint transmissions by UEs in RRC_IDLE/RRC_INACTIVE states may be supported for keeping maximum commonality between RRC_CONNECTED state and RRC_IDLE/RRC_INACTIVE state for the configuration of PTM reception. For example, receiving Point to Multipoint transmissions by UEs in RRC_IDLE/RRC_INACTIVE states may be supported without the need for those UEs to get the configuration of the PTM bearer carrying the Broadcast/Multicast service while in RRC_CONNECTED state beforehand. For example, flexible resource allocation between Unicast and Broadcast/Multicast services may be supported.

SUMMARY

A RAN node (for example, a gNB) may be composed of a Central Unit (CU) and a Distributed Unit (DU). For Multicast and/or Broadcast Services, one or more necessary coordination functions (for example, functions hosted by MCE) may be reside in a Central Unit (CU) of a RAN node.

Dynamic change of multicast/broadcast service delivery between multicast and unicast may be supported for service continuity for a UE in RRC_CONNECTED state. If there is no support for dynamic change, the radio resource for multicast/broadcast may be used inefficiently because the multicast/broadcast related channel may be used continuously though few UEs receive the multicast/broadcast data. Also, user experience may be degraded due to not guaranteeing the service continuity for a UE during the change of multicast/broadcast service delivery between multicast and unicast. Therefore, dynamic change of multicast/broadcast service delivery between multicast and unicast with service continuity for a UE in RRC_CONNECTED state is needed.

Multicast and broadcast service may be provided via a Central Unit (CU)-User Plane (UP) of a RAN node. A CU-UP of a RAN node may receive traffic for the multicast and broadcast service from a Multicast and/or Broadcast (MB)-User Plane Function (MB-UPF). For example, a CU-UP of a RAN node may need to join a multicast group for a multicast and/or broadcast service.

Therefore, studies for multicast and broadcast service in a wireless communication system are needed.

In an aspect, a method performed by a Central Unit (CU)-User Plane (UP) of a Radio Access Network (RAN) node in a wireless communication system is provided. A CU-UP of a RAN node receives, from a CU-Control Plane (CP) of the RAN node, a first message to join a multicast group for a Multicast and/or Broadcast (MB) service. A CU-UP of a RAN node performs the Multicast Listener Discovery (MLD) and/or Internet Group Management Protocol (IGMP) Join procedure for the MB service indicated by the identity for the MB service along with an MB-User Plane Function (UPF) based on the LL MC address. A CU-UP of a RAN node transmits, to the CU-CP of the RAN node, a second message including a Join Complete Indication informing that joining the multicast group for the MB service is completed.

In another aspect, an apparatus for implementing the above method is provided.

The present disclosure may have various advantageous effects.

According to some embodiments of the present disclosure, a Radio Access Network (RAN) node (for example, a base station such as an eNB or a gNB) could efficiently provide a multicast and broadcast service.

For example, gNB-CU-CP, the gNB-CU-UP, and the gNB-DU could properly perform switching between unicast and multicast for an MBS based on a number of RRC_CONNECTED UEs, resource status in the gNB-CU-UP, and gNB-DU's radio situation. Therefore, the resource for multicast and/or broadcast could be used efficiently. In addition, a wireless communication system could avoid the degradation of UE's experience by switching between unicast and multicast in a gNB.

For example, a RAN node could efficiently perform MLD and/or IGMP Join procedure with an MB-UPF. Therefore, the RAN node could efficiently provide a multicast and/or broadcast service.

For example, a CU-UP of a RAN node could transmit broadcast and/or multicast service data to a DU of the RAN node without loss, based on information provided by a CU-CP of the RAN node. Therefore, UEs receiving the multicast and/or broadcast service from the DU could avoid to be degraded.

For example, a CU-CP of a RNA node could provide information to a CU-UP of the RAN node to join a specific multicast service. Therefore, the CU-UP could receive data related to the specific multicast service efficiently.

For example, a CU-UP of a RAN node could receive information on IP multicast transport for the multicast service from the CN via a CU-CP of the RAN node. Therefore, the CU-UP could receive data related to the multicast service using the received information.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIGS. 11A, 11B, 12A, and 12B show an example of a method for multicast and broadcast service in a wireless communication system.

DETAILED DESCRIPTION

Figure 1:
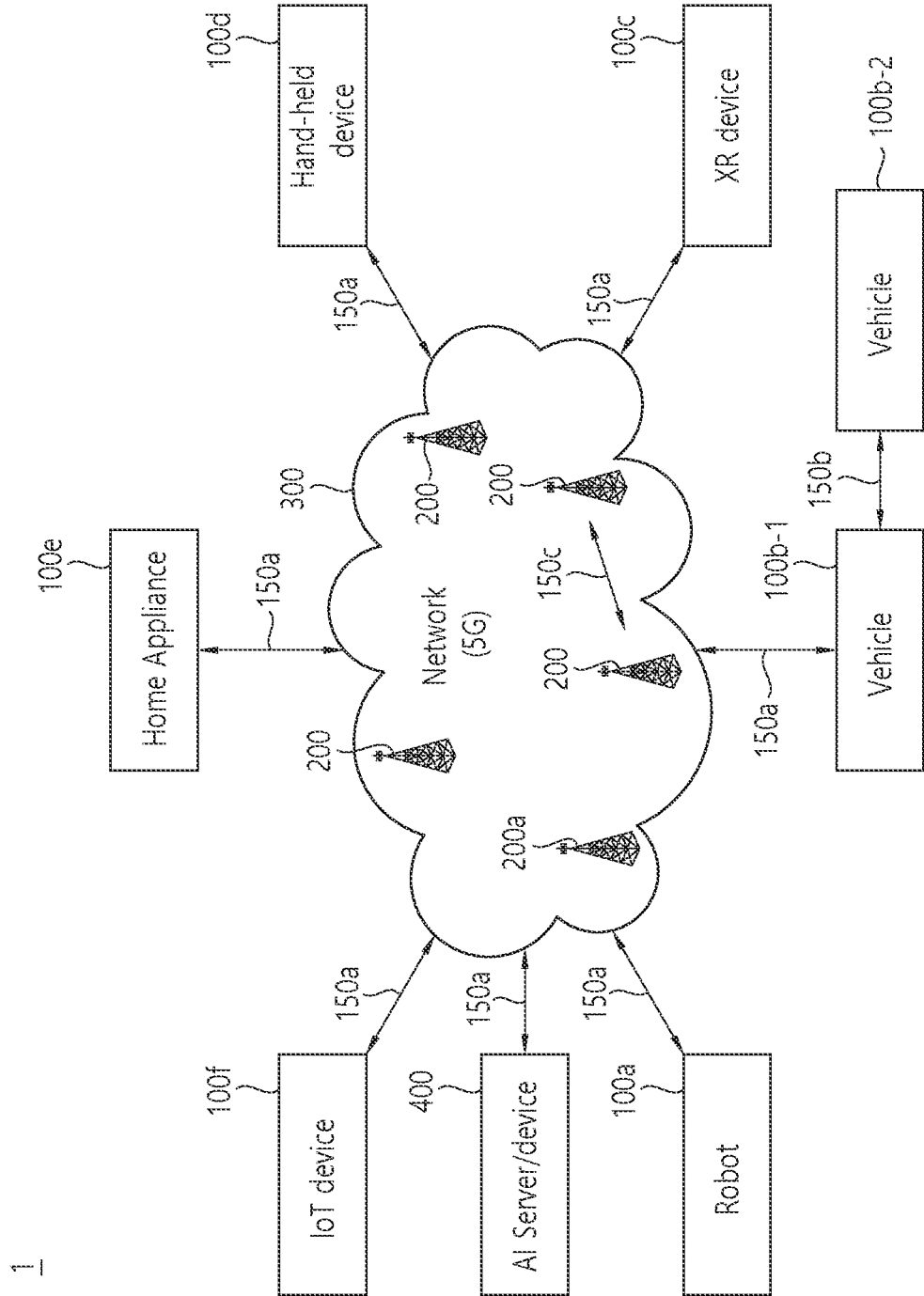
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set.

The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
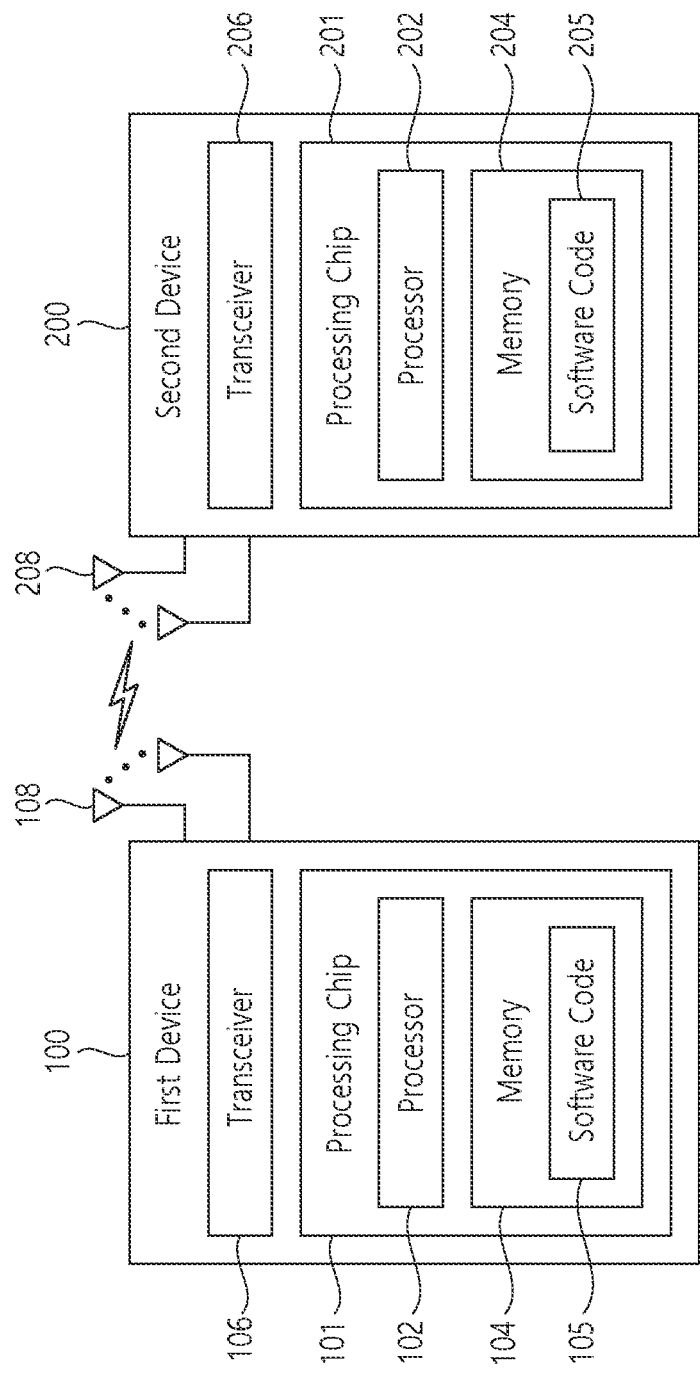
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
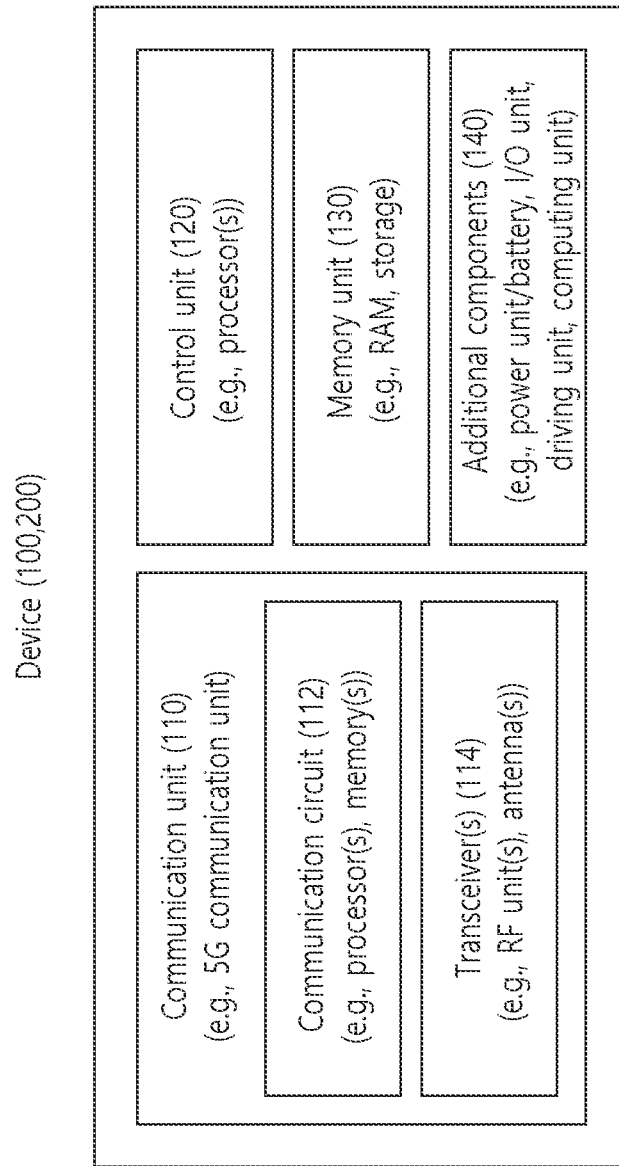
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
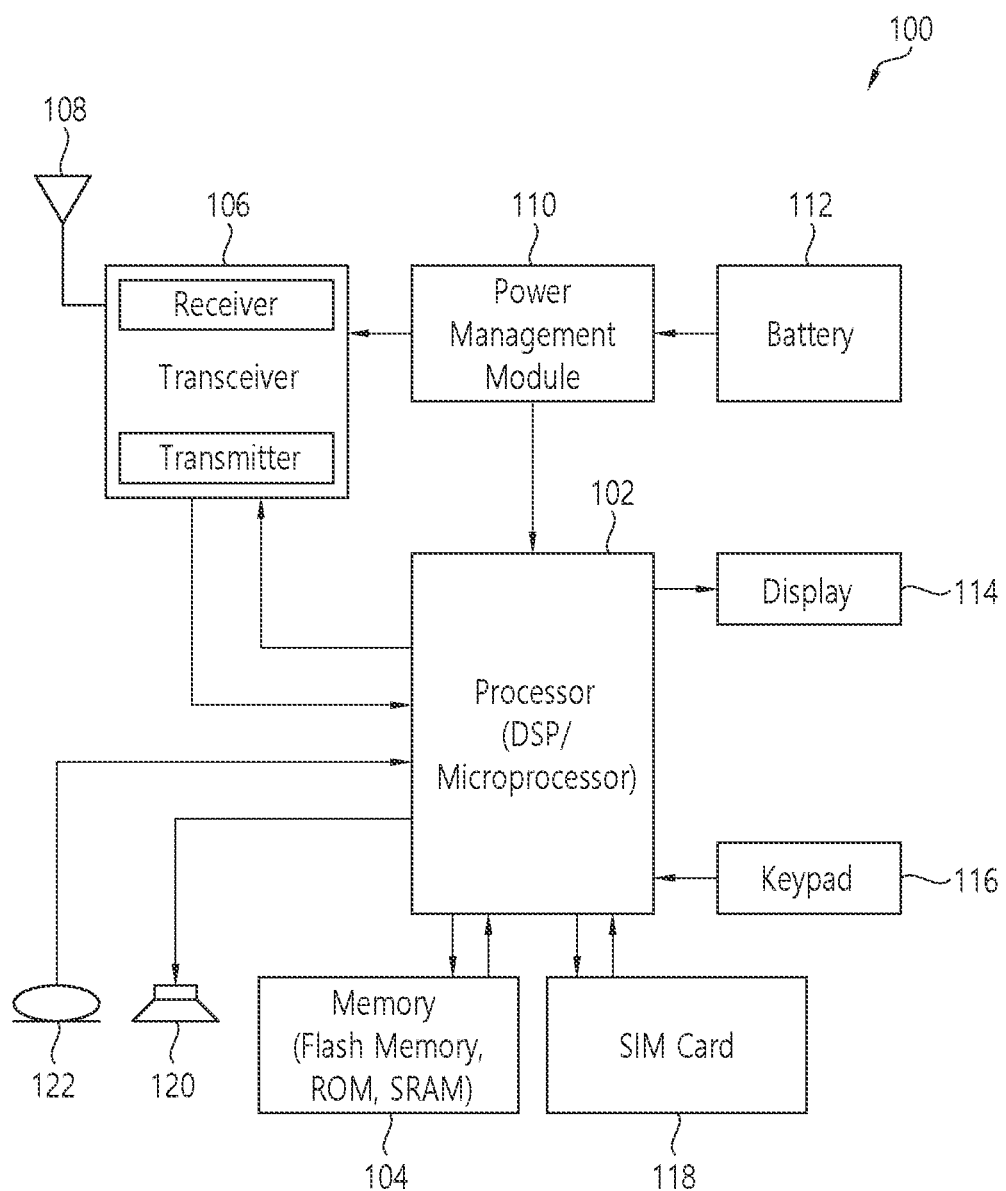
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor.

The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
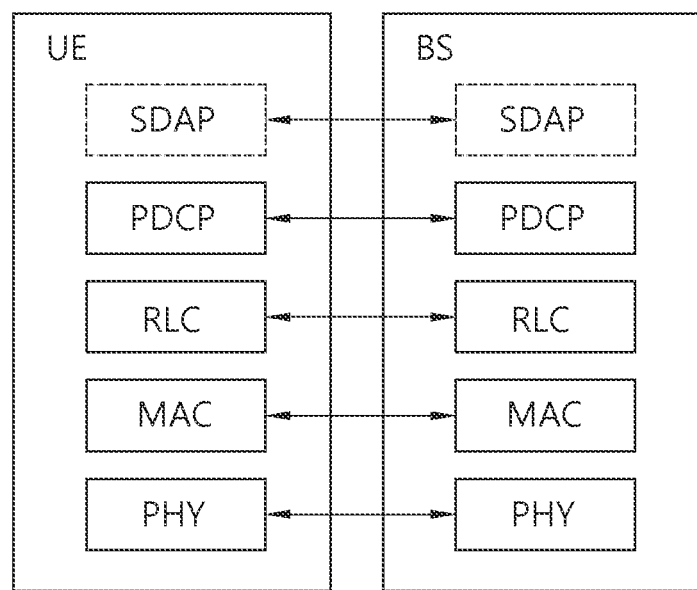
FIGS. 5 and 6 show an example of protocol stacks in a 3GPP based wireless communication system to which implementations of the present disclosure is applied.
Figure 6:
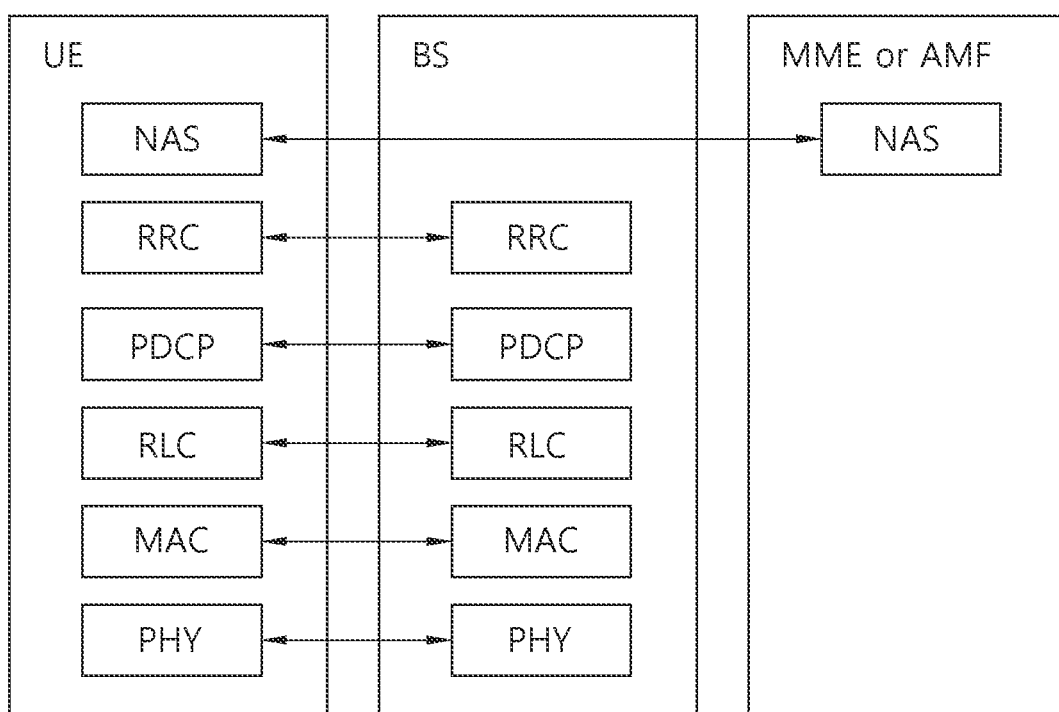

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
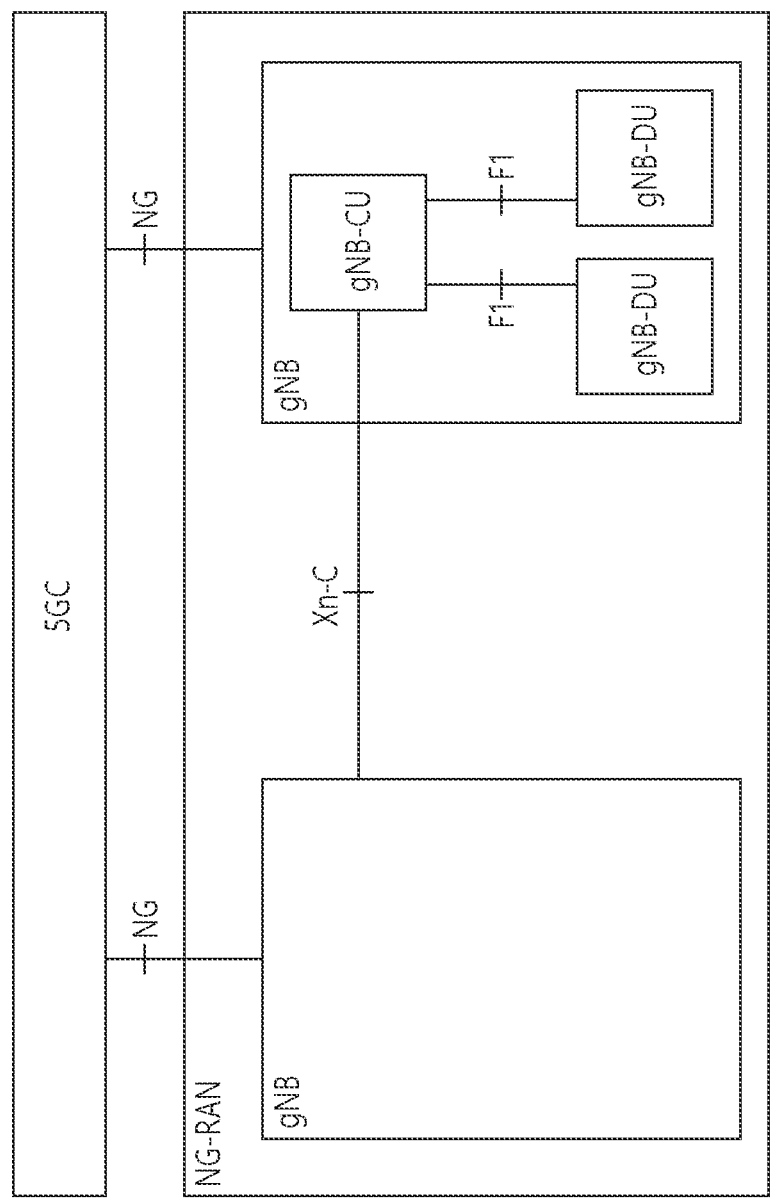
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 8:
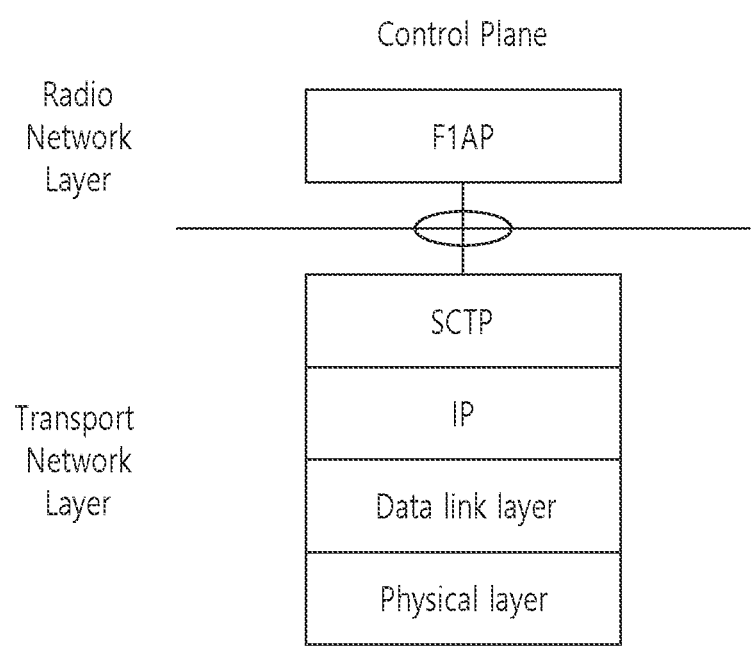
FIG. 8 shows an interface protocol structure for F1-C to which technical features of the present disclosure can be applied.

FIG. 8 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Hereinafter, 5GS Connection Management states are described. Section 5.3.3.2 of 3GPP TS 23.501 V16.4.0 may be referred.

Two CM states are used to reflect the NAS signalling Connection of the UE with the AMF: (1) CM-IDLE, and (2) CM-CONNECTED.

The CM state for 3GPP access and Non-3GPP access are independent of each other, i.e. one can be in CM-IDLE state at the same time when the other is in CM-CONNECTED state.

A UE in CM-IDLE state has no NAS signalling connection established with the AMF over N1. The UE performs cell selection/cell reselection and PLMN selection.

There are no AN signalling connection, N2 connection and N3 connections for the UE in the CM-IDLE state.

The UE provides 5G-S-TMSI as part of AN parameters during AN signalling connection establishment. The UE shall enter CM-CONNECTED state whenever an AN signalling connection is established between the UE and the AN (entering RRC Connected state over 3GPP access, or at the establishment of the UE-N3IWF connectivity over untrusted non-3GPP access or the UE-TNGF connectivity over trusted non-3GPP access). The transmission of an Initial NAS message (Registration Request, Service Request or Deregistration Request) initiates the transition from CM-IDLE to CM-CONNECTED state.

The AMF shall enter CM-CONNECTED state for the UE whenever an N2 connection is established for this UE between the AN and the AMF. The reception of initial N2 message (e.g., N2 INITIAL UE MESSAGE) initiates the transition of AMF from CM-IDLE to CM-CONNECTED state.

The UE and the AMF may optimize the power efficiency and signalling efficiency of the UE when in CM-IDLE state e.g. by activating MICO mode A UE in CM-CONNECTED state has a NAS signalling connection with the AMF over N1. A NAS signalling connection uses an RRC Connection between the UE and the NG-RAN and an NGAP UE association between the AN and the AMF for 3GPP access. A UE can be in CM-CONNECTED state with an NGAP UE association that is not bound to any TNLA between the AN and the AMF. Upon completion of a NAS signalling procedure, the AMF may decide to release the NAS signalling connection with the UE.

The AMF may keep a UE CM state in the AMF in CM-CONNECTED state until the UE de-registers from the core network.

A UE in CM-CONNECTED state can be in RRC Inactive state. When the UE is in RRC Inactive state the following applies:

UE reachability is managed by the RAN, with assistance information from core network;

UE paging is managed by the RAN.

UE monitors for paging with UE's CN (5G S-TMSI) and RAN identifier.

Hereinafter, UE Context Setup procedure and UE Context Modification procedure are described. Section 8.3 of 3GPP TS 38.473v16.1.0 may be referred.

The purpose of the UE Context Setup procedure is to establish the UE Context including, among others, SRB, and DRB configuration. The procedure uses UE-associated signalling.

The gNB-CU initiates the procedure by sending UE CONTEXT SETUP REQUEST message to the gNB-DU. If the gNB-DU succeeds to establish the UE context, it replies to the gNB-CU with UE CONTEXT SETUP RESPONSE. If no UE-associated logical F1-connection exists, the UE-associated logical F1-connection shall be established as part of the procedure.

The gNB-DU shall report to the gNB-CU, in the UE CONTEXT SETUP RESPONSE message, the result for all the requested DRBs and SRBs in the following way:

A list of DRBs which are successfully established shall be included in the DRB Setup List IE;

A list of DRBs which failed to be established shall be included in the DRB Failed to Setup List IE;

A list of SRBs which failed to be established shall be included in the SRB Failed to Setup List IE.

A list of successfully established SRBs with logical channel identities for primary path shall be included in the SRB Setup List IE only if CA based PDCP duplication is initiated for the concerned SRBs.

When the gNB-DU reports the unsuccessful establishment of a DRB or SRB, the cause value should be precise enough to enable the gNB-CU to know the reason for the unsuccessful establishment.

For EN-DC operation, the gNB-CU shall include in the UE CONTEXT SETUP REQUEST the E-UTRAN QoS IE. The allocation of resources according to the values of the Allocation and Retention Priority IE included in the E-UTRAN QoS IE shall follow the principles described for the E-RAB Setup procedure.

For NG-RAN operation, the gNB-CU shall include in the UE CONTEXT SETUP REQUEST the DRB Information IE.

If the gNB-CU includes the SMTC information of the measured frequency(ies) in the MeasurementTimingConfiguration IE of the CU to DU RRC Information IE that is included in the UE CONTEXT SETUP REQUEST message, the gNB-DU shall generate the measurement gaps based on the received SMTC information. Then the gNB-DU shall send the measurement gaps information to the gNB-CU in the MeasGapConfig IE of the DU to CU RRC Information IE that is included in the UE CONTEXT SETUP RESPONSE message.

The UEAssistanceInformation IE shall be included in CU to DU RRC Information IE in the UE CONTEXT SETUP REQUEST message if the gNB-CU received this IE from the UE; if the UEAssistanceInformation IE is included in the CU to DU RRC Information IE in the UE CONTEXT SETUP REQUEST message, the gNB-DU shall, if supported, take it into account when configuring resources for the UE.

The gNB-DU shall store the received gNB-DU UE Aggregate Maximum Bit Rate Uplink and use it for non-GBR Bearers for the concerned UE.

If the gNB-DU is not able to establish an F1 UE context, or cannot even establish one bearer it shall consider the procedure as failed and reply with the UE CONTEXT SETUP FAILURE message.

If the gNB-DU is not able to accept the SpCell ID IE in UE CONTEXT SETUP REQUEST message, it shall reply with the UE CONTEXT SETUP FAILURE message with an appropriate cause value. Further, if the Candidate SpCell List IE is included in the UE CONTEXT SETUP REQUEST message and the gNB-DU is not able to accept the SpCell ID IE, the gNB-DU shall, if supported, include the Potential SpCell List IE in the UE CONTEXT SETUP FAILURE message and the gNB-CU should take this into account for selection of an opportune SpCell. The gNB-DU shall include the cells in the Potential SpCell List IE in a priority order, where the first cell in the list is the one most desired and the last one is the one least desired (e.g., based on load conditions). If the Potential SpCell List IE is present but no Potential SpCell Item IE is present, the gNB-CU should assume that none of the cells in the Candidate SpCell List IE are acceptable for the gNB-DU.

If the gNB-DU receives a UE CONTEXT SETUP REQUEST message containing a E-UTRAN QoS IE for a GBR QoS DRB but where the GBR QoS Information IE is not present, the gNB-DU shall report the establishment of the corresponding DRB as failed in the DRB Failed to Setup List IE of the UE CONTEXT SETUP RESPONSE message with an appropriate cause value. If the gNB-DU receives a UE CONTEXT SETUP REQUEST message containing a DRB QoS IE for a GBR QoS DRB but where the GBR QoS Flow Information IE is not present, the gNB-DU shall report the establishment of the corresponding DRBs as failed in the DRB Failed to Setup List IE of the UE CONTEXT SETUP RESPONSE message with an appropriate cause value.

If the Delay Critical IE is included in the Dynamic 5QI Descriptor IE within the DRB QoS IE in the UE CONTEXT SETUP REQUEST message and is set to the value "delay critical" but the Maximum Data Burst Volume IE is not present, the gNB-DU shall report the establishment of the corresponding DRB as failed in the DRB Failed to Setup List IE of the of the UE CONTEXT SETUP RESPONSE message with an appropriate cause value.

The purpose of the UE Context Modification procedure is to modify the established UE Context, e.g., establishing, modifying and releasing radio resources. This procedure is also used to command the gNB-DU to stop data transmission for the UE for mobility. The procedure uses UE-associated signalling.

The UE CONTEXT MODIFICATION REQUEST message is initiated by the gNB-CU.

Upon reception of the UE CONTEXT MODIFICATION REQUEST message, the gNB-DU shall perform the modifications, and if successful reports the update in the UE CONTEXT MODIFICATION RESPONSE message.

The gNB-DU shall report to the gNB-CU, in the UE CONTEXT MODIFICATION RESPONSE message, the result for all the requested or modified DRBs and SRBs in the following way:

A list of DRBs which are successfully established shall be included in the DRB Setup List IE;
A list of DRBs which failed to be established shall be included in the DRB Failed to be Setup List IE;
A list of DRBs which are successfully modified shall be included in the DRB Modified List 1E;
A list of DRBs which failed to be modified shall be included in the DRB Failed to be Modified List IE;
A list of SRBs which failed to be established shall be included in the SRB Failed to be Setup List IE.
A list of successfully established SRBs with logical channel identities for primary path shall be included in the SRB Setup List IE only if CA based PDCP duplication is initiated for the concerned SRBs.
A list of successfully modified SRBs with logical channel identities for primary path shall be included in the SRB Modified List IE only if CA based PDCP duplication is initiated for the concerned SRBs.

When the gNB-DU reports the unsuccessful establishment of a DRB or SRB, the cause value should be precise enough to enable the gNB-CU to know the reason for the unsuccessful establishment.

In case none of the requested modifications of the UE context can be successfully performed, the gNB-DU shall respond with the UE CONTEXT MODIFICATION FAILURE message with an appropriate cause value.

If the gNB-DU is not able to accept the SpCell ID IE in UE CONTEXT MODIFICATION REQUEST message, it shall reply with the UE CONTEXT MODIFICATION FAILURE message.

If the gNB-DU receives a UE CONTEXT MODIFICATION REQUEST message containing a E-UTRAN QoS IE for a GBR QoS DRB but where the GBR QoS Information IE is not present, the gNB-DU shall report the establishment of the corresponding DRB as failed in the DRB Failed to Setup List IE of the UE CONTEXT MODIFICATION RESPONSE message with an appropriate cause value.

If the gNB-DU receives a UE CONTEXT MODIFICATION REQUEST message containing a DRB QoS IE for a GBR QoS DRB but where the GBR QoS Flow Information IE is not present, the gNB-DU shall report the establishment of the corresponding DRBs as failed in the DRB Failed to Setup List IE of the UE CONTEXT MODIFICATION RESPONSE message with an appropriate cause value.

If the Delay Critical IE is included in the Dynamic 5QI Descriptor IE within the DRB QoS IE in the UE CONTEXT MODIFICATION REQUESTmessage and is set to the value "delay critical" but the Maximum Data Burst Volume IE is not present, the gNB-DU shall report the establishment of the corresponding DRB as failed in the DRB Failed to Setup List IE of the of the UE CONTEXT MODIFICATION RESPONSE message with an appropriate cause value.

Hereinafter, gNB-CU-CP Configuration Update procedure and Bearer Context Modification procedure initiated by gNB-CU-CP are described. Section 8.2 and section 8.3 of 3GPP TS 38.463 v16.1.1 may be referred.

The purpose of the gNB-CU-CP Configuration Update procedure is to update application level configuration data needed for the gNB-CU-CP and the gNB-CU-UP to interoperate correctly on the E1 interface. This procedure does not affect existing UE-related contexts, if any. The procedure uses non-UE associated signalling.

The gNB-CU-CP initiates the procedure by sending a GNB-CU-CP CONFIGURATION UPDATE message to the gNB-CU-UP including an appropriate set of updated configuration data that it has just taken into operational use. The gNB-CU-UP responds with GNB-CU-CP CONFIGURATION UPDATE ACKNOWLEDGE message to acknowledge that it successfully updated the configuration data. If an information element is not included in the GNB-CU-CP CONFIGURATION UPDATE message, the gNB-CU-UP shall interpret that the corresponding configuration data is not changed and shall continue to operate with the existing related configuration data.

The updated configuration data shall be stored in both nodes and used as long as there is an operational TNL association or until any further update is performed.

If the gNB-CU-UP cannot accept the update, it shall respond with a GNB-CU-CP CONFIGURATION UPDATE FAILURE message and appropriate cause value.

If the GNB-CU-CP CONFIGURATION UPDATE FAILURE message includes the Time To Wait IE, the gNB-CU-CP shall wait at least for the indicated time before reinitiating the GNB-CU-CP CONFIGURATION UPDATE message towards the same gNB-CU-UP.

The purpose of the Bearer Context Modification procedure is to allow the gNB-CU-CP to modify a bearer context in the gNB-CU-UP. The procedure uses UE-associated signalling.

The gNB-CU-CP initiates the procedure by sending the BEARER CONTEXT MODIFICATION REQUEST message to the gNB-CU-UP. If the gNB-CU-UP succeeds to modify the bearer context, it replies to the gNB-CU-CP with the BEARER CONTEXT MODIFICATION RESPONSE message.

The gNB-CU-UP shall report to the gNB-CU-CP, in the BEARER CONTEXT

MODIFICATION RESPONSE message, the result for all the requested resources in the following way:
For E-UTRAN:
A list of DRBs which are successfully established shall be included in the DRB Setup List IE;
A list of DRBs which failed to be established shall be included in the DRB Failed List IE;
A list of DRBs which are successfully modified shall be included in the DRB Modified List IE;
A list of DRBs which failed to be modified shall be included in the DRB Failed To Modify List IE;
For NG-RAN:
A list of PDU Session Resources which are successfully established shall be included in the PDU Session Resource Setup List IE;
A list of PDU Session Resources which failed to be established shall be included in the PDU Session Resource Failed List IE;
A list of PDU Session Resources which are successfully modified shall be included in the PDU Session Resource Modified List IE;
A list of PDU Session Resources which failed to be modified shall be included in the PDU Session Resource Failed To Modify List IE;
For each successfully established or modified PDU Session Resource, a list of DRBs which are successfully established shall be included in the DRB Setup List IE;
For each successfully established or modified PDU Session Resource, a list of DRBs which failed to be established shall be included in the DRB Failed List IE;
For each successfully modified PDU Session Resource, a list of DRBs which are successfully modified shall be included in the DRB Modified List IE;
For each successfully modified PDU Session Resource, a list of DRBs which failed to be modified shall be included in the DRB Failed To Modify List IE;
For each successfully established or modified DRB, a list of QoS Flows which are successfully established shall be included in the Flow Setup List IE;
For each successfully established or modified DRB, a list of QoS Flows which failed to be established shall be included in the Flow Failed List IE;
When the gNB-CU-UP reports the unsuccessful establishment of a PDU Session Resource, DRB or QoS Flow the cause value should be precise enough to enable the gNB-CU-CP to know the reason for the unsuccessful establishment.

If the gNB-CU-UP cannot successfully perform any of the requested bearer context modifications, it shall respond with a BEARER CONTEXT MODIFICATION FAILURE message and appropriate cause value.

If the gNB-CU-UP receives a BEARER CONTEXT MODIFICATION REQUEST message containing a E-UTRAN QoS IE in the DRB To Setup List or the DRB To Modify List IE for a GBR QoS DRB but where the GBR QoS Information IE is not present, the gNB-CU-UP shall report the addition or the modification of the corresponding DRB as failed in the DRB Failed List IE or the DRB Failed To Modify List IE of the BEARER CONTEXT MODIFICATION RESPONSE message with an appropriate cause value.

If the gNB-CU-UP receives a BEARER CONTEXT MODIFICATION REQUEST message containing a QoS Flow Level QoS Parameters IE in the PDU Session Resource To Setup List IE or the PDU Session Resource To Modify List IE for a GBR QoS Flow but where the GBR QoS Flow Information IE is not present, the gNB-CU-UP shall report the addition or the modification of the corresponding QoS Flow as failed in the corresponding Flow Failed List IE of the BEARER CONTEXT MODIFICATION RESPONSE message with an appropriate cause value.

Meanwhile, a RAN node (for example, a gNB) may be composed of a Central Unit (CU) and a Distributed Unit (DU). For Multicast and/or Broadcast Services, one or more necessary coordination functions (for example, functions hosted by MCE) may be reside in a Central Unit (CU) of a RAN node.

Dynamic change of multicast/broadcast service delivery between multicast and unicast may be supported for service continuity for a UE in RRC_CONNECTED state. If there is no support for dynamic change, the radio resource for multicast/broadcast may be used inefficiently because the multicast/broadcast related channel may be used continuously though few UEs receive the multicast/broadcast data. Also, user experience may be degraded due to not guaranteeing the service continuity for a UE during the change of multicast/broadcast service delivery between multicast and unicast. Therefore, dynamic change of multicastlbroadcast service delivery between multicast and unicast with service continuity for a UE in RRC_CONNECTED state is needed.

Multicast and broadcast service may be provided via a Central Unit (CU)-User Plane (UP) of a RAN node. A CU-UP of a RAN node may receive traffic for the multicast and broadcast service from a Multicast and/or Broadcast (MB)-User Plane Function (MB-UPF). For example, a CU-UP of a RAN node may need to join a multicast group for a multicast and/or broadcast service.

Therefore, studies for multicast and broadcast service in a wireless communication system are needed.

Hereinafter, a method for multicast and broadcast service in a wireless communication system, according to some embodiments of the present disclosure, will be described.

Figure 9:
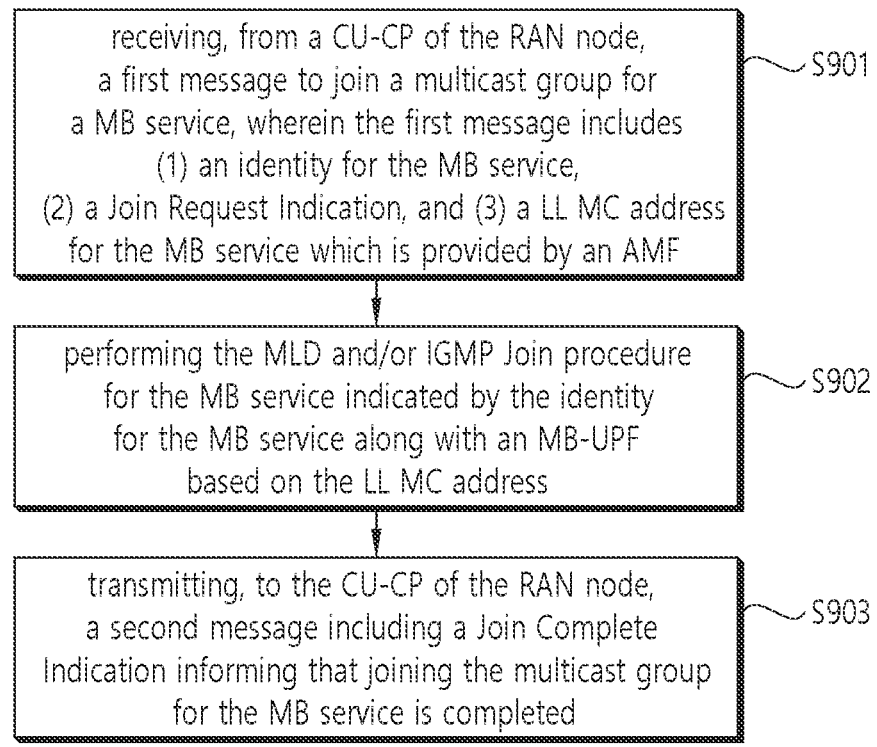
FIG. 9 shows an example of a method for multicast and broadcast service in a wireless communication system.

FIG. 9 shows an example of a method for multicast and broadcast service in a wireless communication system.

In particular, FIG. 9 shows an example of a method performed by a Central Unit (CU)-User Plane (UP) of a Radio Access Network (RAN) node in a wireless communication system.

In step S901, the CU-UP of the RAN node may receive, from a CU-Control Plane (CP) of the RAN node, a first message to join a multicast group for a Multicast and/or Broadcast (MB) service. The first message may include (1) an identity for the MB service, (2) a Join Request Indication, and (3) a low layer multicast (LL MC) address for the MB service which is provided by an Access and Mobility management Function (AMF).

For example, the first message may be a CU-CP Configuration Update message.

For example, the identity for the MB service may be a Temporary Mobile Group Identity (TMGI) for the MB service.

For example, the first message may include a Downlink (DL) Tunnel Endpoint Identifier (TEID) for the MB service. The TEID may be used for data transmission for the MB service from the CU-UP to a Distributed Unit (DU) of the RAN node.

According to some embodiments of the present disclosure, the CU-UP may receive, from the CU-CP, a third message to request setup of a bearer for the MB service between the CU-UP and a Distributed Unit of the RAN node.

For example, the CU-UP may receive the third message before receiving the first message.

For example, the third message may include the identity for the MB service to indicate that the bearer is related to the MB service.

For example, the third message may include (1) a multicast radio bearer (MRB) Setup List for the MB service, (2) Service Data Adaptation Protocol (SDAP) configuration for the MB service, (3) Packet Data Convergence Protocol (PDCP) configurations for the MB service, and/or (4) information on a Quality of Service (QoS) flow for the MB service.

For example, upon receiving the third message, the CU-UP may determine that a resource for the bearer is available. The CU-UP may establish the bearer for the MB service. Then, the CU-UP may transmit, to the CU-CP, a fourth message to inform that the bearer is established. The fourth message may include (1) the identity for the MB service to indicate the bearer, and (2) information on the resource for the bearer.

According to some embodiments of the present disclosure, the LL MC address may be used for a multicast transport. For example, the LL MC address may be used for a source specific multicast transport. For example, the parameter "LL MC Address" may be accompanied by a "Source host address" parameter.

For example, MB-Session Management Function (SMF) may allocate a TMGI, a Lower Layer Multicast IP Address (LL MC address) for N3, and N6 tunnel information and store the information in a new MB Session Context set to 'inactive' state. MB-SMF may return the TMGI and the N6 tunnel information to the NEF/MBSF. If MB-SMF makes the TMGI allocation, the MB-SMF may allocate a TMGI from a pre-configured TMGI range.

For example, for large networks or for redundancy reasons, the NEF/MBSF may use multiple MB-SMFs (and MB-UPFs).

For example, since the N3 LL MC address is used for 5GS internal transport, it may be considered sufficient to allocate the N3 LL MC address at Session Start, for example, when resources for the MB Session is allocated in different nodes. A one-to-one relationship between N3 LL MC Address and MB Session may be used.

According to some embodiments of the present disclosure, the LL MC address may be used for a Session Start procedure. For example, MB-SMF may set the MB Session Context to active and send MB Session Start messages (for example, the MB Session Start messages may include TMGI, LL MC Address and source host address, 5G Authorized QoS Profile) to all AMFs that has earlier joined the MB Session.

For example, the LL MC Address and source host address of MB-UPF may be provided if multicast transport is configured to be used between the NG-RAN and MB-UPF nodes.

According to some embodiments of the present disclosure, the LL MC address may be used as a transport network IP Multicast Address for MBMS Session Start Procedure for E-UTRAN and UTRAN for EPS. For example, the MME or SGSN may create an MBMS bearer context. The MME/SGSN may store the session attributes and send a Session Start Request message including the session attributes (TMGI, QoS, MBMS service area, list of cell IDs if available, Session identifier, estimated session duration, broadcast (for UTRAN only), transport network IP Multicast Address, IP address of the multicast source, C-TEID, . . . ) to E-UTRAN/UTRAN. Optionally in the case of E-UTRAN access and if the MBMS GW supports both IPv4 and IPv6, the MME may include both an IPv4 and an IPv6 IP Multicast address together with the corresponding alternative IP address(es) of the multicast source. When connected to multiple MCEs, the MME should filter the distribution of Session Control message to the MCEs based on the MBMS service area.

In step S902, the CU-UP of the RAN node may perform the Multicast Listener Discovery (MLD) and/or Internet Group Management Protocol (IGMP) Join procedure for the MB service indicated by the identity for the MB service along with an MB-User Plane Function (UPF) based on the LL MC address.

For example, in the MLD and/or IGMP Join procedure, the CU-UP may join the multicast group for a MB session indicated by the identity for the MB service.

For example, in the IGMP Join Procedure, when the CU-UP of the RAN node wants to join a multicast group, the CU-UP may send one or more unsolicited membership reports for the multicast group it wants to join. When the CU-UP wants to join a group, the CU-UP may send an IGMPv3 membership report with an empty EXCLUDE list. When the CU-UP wants to join a specific channel, the CU-UP may send an IGMPv3 membership report with the address of the specific source included in the INCLUDE list. When the CU-UP wants to join a group excluding particular sources, the CU-UP may send an IGMPv3 membership report excluding those sources in the EXCLUDE list.

For example, the IGMP may provide the basic query-response mechanism that allows the multicast device (for example, the CU-UP and/or the CU-CP) to determine which multicast groups are active and other processes that enable hosts to join and leave a multicast group.

In step S903, the CU-UP of the RAN node may transmit, to the CU-CP of the RAN node, a second message including a Join Complete Indication informing that joining the multicast group for the MB service is completed.

For example, the second message is a CU-CP Configuration Update Acknowledge message. The second message may include the MBS Identity and the Join Complete Indication to inform the gNB-CU-CP that joining the multicast group for the MB session indicated by the MBS Identity is completed.

According to some embodiments of the present disclosure, the AMF sends an MB Session Resource Setup Request message including the identity of the MB service, an LL MC address, and 5G Authorized QoS Profile to the CU-CP. For example, CM CONNECTED UEs may have joined the CU-CP. The CU-CP may create an MB session context for the MB service.

The CU-CP may send, to the CU-UP, the third message include the identity for the MB service. The third message may include the UE ID (for example, CU-CP/CU-UP UE E1AP ID) to indicate at least one bearer (for example, data radio bearer or unicast bearer) for the MB service.

For example, the third message may include the multicast radio bearer (MRB) Setup List with the MRB ID, the SDAP/PDCP configurations, and/or the QoS flow related information in order to request setup of at least one bearer for the MB service.

Upon receiving the third message, the CU-UP may check whether to be able to allocate resources for the at least one bearer for the MB service. If available, the CU-UP may establish at least one bearer for the MB service. Then, the CU-UP may transmit, to the CU-CP, the fourth new message to inform that the bearer is established.

The fourth message may contain the identity for the MB service and MRB Setup List to indicate the established at least one bearer for the MB service (for example, the MRB resources).

The CU-CP may send, to the DU, a fifth message including the identity for the MB service, MRB Setup List with the MRB ID, and/or the QoS flow related information (for example, 5G Authorized QoS Profile). Also, the fifth message may contain the UE ID (for example, gNB-CU/gNB-DU UE FLAP ID) for the MB service.

Upon receiving the message from the CU-CP, the DU may check whether to be able to allocate the radio resource for the at least one bearer for the MB service. If available, the DU may respond with a sixth message to the CU-CP. The sixth message may include the MBS Channel Information and the Identity for the MB service. The DU may provide multicast channel information to the UE(s) for the MB service. In addition, the sixth message may include the downlink tunnel endpoint (DL TEID) for data transmission for the MB service from the gNB-CU-UP to the gNB-DU.

Upon the receipt of the sixth message from the DU, the CU-CP may send, to the CU-UP, the first to indicate downlink tunnel endpoint to be used for data transmission for the MB service from the CU-UP to the DU.

The first message may contain the identity for the MB service to indicate that the requested bearer is related to which MBS. The first message may include the Join Request Indication and/or the LL MC address so that the CU-UP joins the multicast group for indicated MB session.

On receiving the first message from the CU-CP, the CU-UP may store the received DL TEID and use it to transmit multicast/broadcast data for the indicated MB service. When the Join Request Indication and/or the LL MC address are included into the first message from the CU-CP, the CU-UP may perform the MLD and/or IGMP Join procedure for the MB session indicated by the identity for the MB service along with the MB-UPF.

The CU-UP may respond with the second message including the identity for the MB service and the Join Complete Indication to inform that joining the multicast group for the MB session indicated by the identity for the MB service is completed.

Upon receiving the message from the CU-UP, the CU-CP may transmit the DL RRC Message Transfer message with the RRCReconfiguration in order to provide the multicast channel related information to the UE provided with the indicated MB service. If there are multiple UEs provided with the indicated MB service, the CU may send this FLAP message with the RRCReconfiguration to all of those UEs.

Then, the DU may send the UL RRC Message Transfer message to the CU-CP to forward the RRCReconfiguration-Complete received from the UE.

The CU-CP may report successful establishment of the MB session resource by sending MB Session Resource Setup Response message including the MBS Identity to the AMF.

Figure 10A:
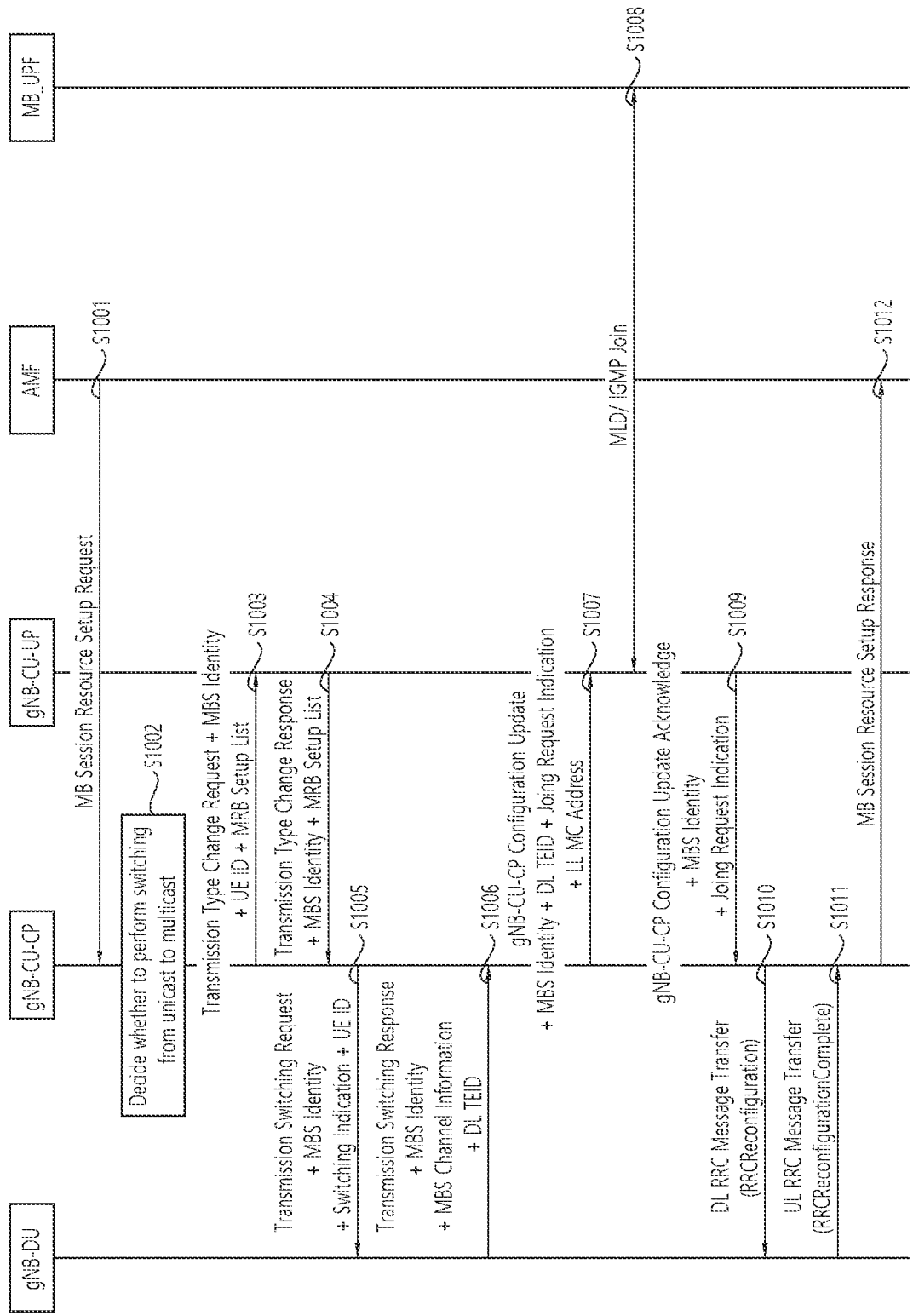
FIGS. 10A and 10B show an example of a method for multicast and broadcast service in a wireless communication system.
Figure 10B:
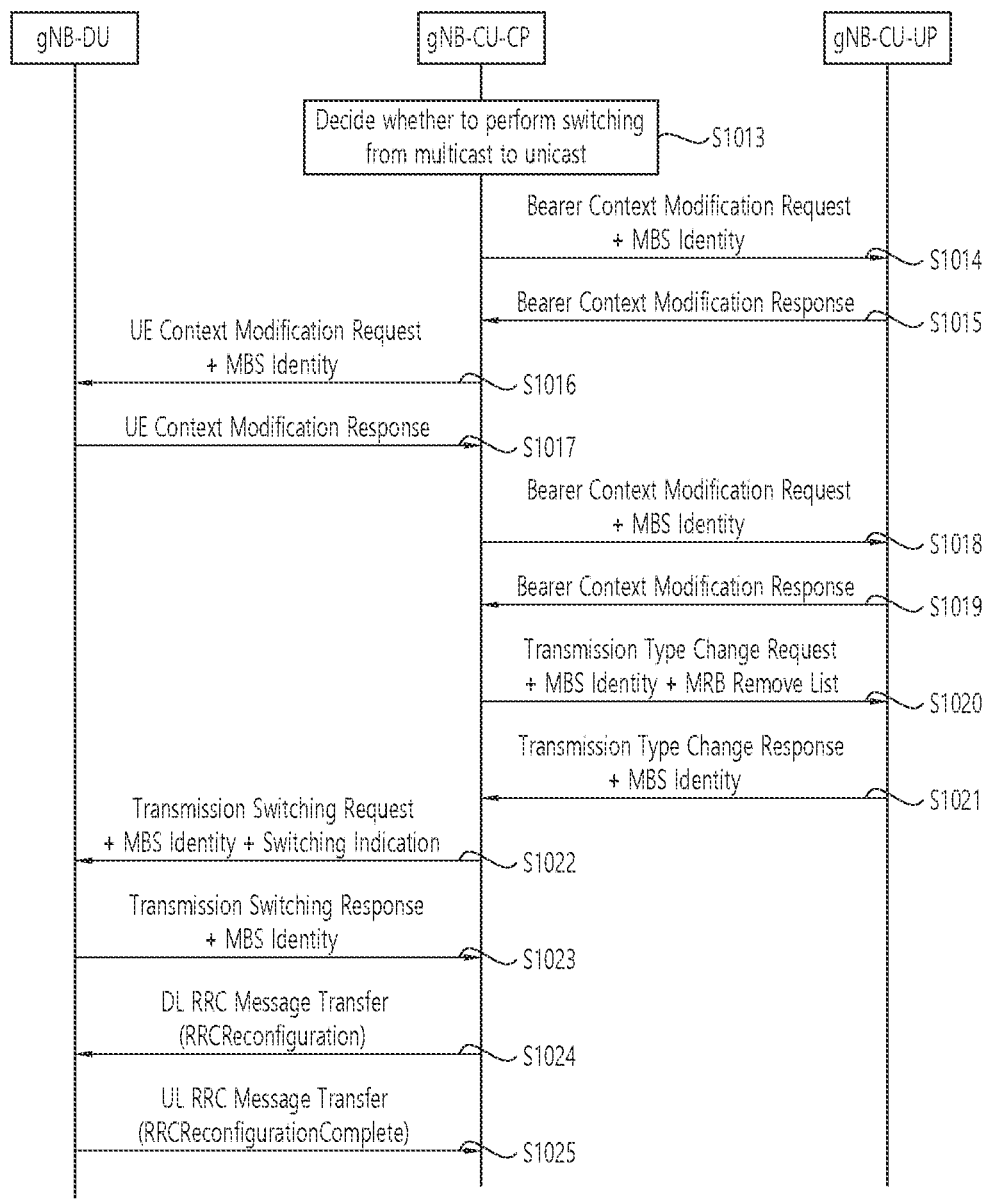

FIGS. 10A and 10B show an example of a method for multicast and broadcast service in a wireless communication system.

In particular, FIG. 10A shows an example of a procedure for switching from unicast to multicast. In addition, FIG. 10B shows an example of a procedure for switching from multicast to unicast.

According to some embodiments of the present disclosure, a gNB-CU-CP may request a switching between multicast and unicast for the multicast/broadcast service (MBS) to a gNB-CU-UP and a gNB-DU based on the number of RRC_CONNECTED UEs, when the AMF requests the MB session resource setup to start transmission of multicast data, or during transmission of multicast data.

Then, the gNB-CU-UP and the gNB-DU may respond acceptance for the request of the gNB-CU-CP considering their respective resource situation. Also, the gNB-CU-CP may request joining the multicast group for the MB session to the gNB-CU-UP when to start transmission of multicast data.

In case of unicast to multicast switching, the gNB-CU-UP and the gNB-DU may provide the gNB-CU-CP with a setup list of multicast radio bearer (MRB) for the MBS and the multicast/broadcast channel information for the MBS in order to offer this information to the UE(s) provided with the MBS respectively.

In case of multicast to unicast switching, the gNB-CU-UP and the gNB-DU may remove the allocated resource for MRB related to the MBS based on a remove list of MRB provided by the gNB-CU-CP. In addition, the gNB-CU-CP may provide the gNB-CU-UP and the gNB-DU with the MBS identity (for example, TMGI, and/or MBS flow identity) when the AMF requests the MB session resource setup for the MBS identity.

Referring to FIGS. 10A and 10B, in step S1001, the AMF may send the MB Session Resource Setup Request, existing, or new message including the MBS Identity (for example, TMGI), low layer multicast (LL MC) address, and/or 5G Authorized QoS Profile to the gNB-CU-CP where CM CONNECTED UEs that has joined the TMGI resides.

In step S1002, on receiving the request message from the AMF, the gNB-CU-CP may create the MB session context for the received MBS Identity. Based on the number of RRC_CONNECTED UEs, the gNB-CU-CP may determine whether to perform switching from unicast to multicast.

In step S1003, the gNB-CU-CP may send the Transmission Type Change Request, existing, or new message to the gNB-CU-UP to request the change from unicast to multicast. This message may include the MBS Identity to indicate the MBS to be changed. Also, this message may contain the UE ID (for example, gNB-CU-CP/gNB-CU-UP UE E1AP ID) to indicate removing the established bearer(s) (for example, data radio bearer or unicast bearer) for multicast/broadcast data transmission related to the MBS which an indicated UE(s) has used. In addition, this message may include the multicast radio bearer (MRB) Setup List with the MRB ID, the SDAP/PDCP configurations, and/or the QoS flow related information in order to request setup of MRB for the indicated MBS.

In step S1004, when to receive the message from the gNB-CU-CP, the gNB-CU-UP may check whether to be able to allocate the requested MRB resources for the MBS. If available, it may respond with the Transmission Type Change Response, existing, or new message to the gNB-CU-CP. This message may contain the MBS Identity and MRB Setup List to indicate establishing the MRB resources for the indicated MBS. Although the request message from the gNB-CU-CP does not include the UE ID, based on the received MBS Identity, the gNB-CU-UP may remove the established bearer(s) (for example, data radio bearer or unicast bearer) for multicast/broadcast data transmission related to the MBS.

In step S1005, in order to request the switching from unicast to multicast, the gNB-CU-CP may send the Transmission Switching Request, existing, or new message to the gNB-DU. This message may include the MBS Identity to indicate the MBS to be switched. In addition, this message may contain the Switching Indication to inform the gNB-DU of the unicast to multicast switching. This indication may be MRB Setup List with the MRB ID, and/or the QoS flow related information (for example, 5G Authorized QoS Profile). Also, this message may contain the UE ID (for example, gNB-CU/gNB-DU UE F1AP ID) to indicate removing the established bearer(s) (for example, data radio bearer or unicast bearer) for multicast/broadcast data transmission related to the MBS which an indicated UE(s) has used.

In step S1006, on receiving the message from the gNB-CU-CP, the gNB-DU may check whether to be able to allocate the radio resource for MRB related to the indicated MBS. If available, it may respond with the Transmission Switching Response, existing, or new message to the gNB-CU-CP. This message may include the MBS Channel Information and the MBS Identity to provide multicast channel information to the UE(s) provided with the indicated MBS. Although the request message from the gNB-CU-CP does not include the UE ID, based on the received MBS Identity, the gNB-DU may remove the established bearer(s) (for example, data radio bearer or unicast bearer) for multicast/broadcast data transmission related to the MBS. In addition, this message may include the downlink tunnel endpoint (DL TEID) for multicast/broadcast data transmission from the gNB-CU-UP to the gNB-DU.

In step S1007, upon the receipt of the message from the gNB-DU, the gNB-CU-CP may send the gNB-CU-CP Configuration Update or new message with the DL TEID to the gNB-CU-UP in order to indicate downlink tunnel endpoint to be used for multicast/broadcast data transmission from the gNB-CU-UP to the gNB-DU. This message may contain the MBS Identity to indicate that the requested bearer is related to which MBS. This message may include the Join Request Indication and/or the LL MC address so that the gNB-CU-UP joins the multicast group for indicated MB session in case the gNB-CU-CP has received the MB Session Resource Setup Request message.

In step S1008, on receiving the message from the gNB-CU-CP, the gNB-CU-UP may store the received DL TEID and use it to transmit multicast/broadcast data for the indicated MBS. If the Join Request Indication and/or the LL MC address are included into the message from the gNB-CU-CP, the gNB-CU-UP may perform the MLD/IGMP Join procedure for the MB session indicated by the MBS Identity along with the MB-UPF.

In step S1009, the gNB-CU-UP may respond with the gNB-CU-CP Configuration Update Acknowledge or new message. This message may include the MBS Identity and the Join Complete Indication to inform the gNB-CU-CP that joining the multicast group for the MB session indicated by the MBS Identity is completed.

In step S1010, when to receive the message from the gNB-CU-UP, the gNB-CU-CP may transmit the DL RRC Message Transfer message with the RRCReconfiguration in order to provide the multicast channel related information to the UE provided with the indicated MBS. If there are multiple UEs provided with the indicated MBS, the gNB-CU may send this F1AP message with the RRCReconfiguration to all of those UEs.

In step S1011, the gNB-DU may send the UL RRC Message Transfer message to the gNB-CU-CP to forward the RRCReconfigurationComplete received from the UE.

In step S1012, the gNB-CU-CP may report successful establishment of the MB session resource by sending MB Session Resource Setup Response, existing, or new message including the MBS Identity to the AMF.

In step S1013, during the PTM transmission, based on the number of RRC_CONNECTED UEs, the gNB-CU-CP may determine whether to perform switching from multicast to unicast.

In step S1014, the gNB-CU-CP may send the Bearer Context Modification Request or new message to the gNB-CU-UP to request establishing the bearer (for example, data radio bearer or unicast bearer) for multicast/broadcast data transmission between the gNB-CU-UP and the gNB-DU. This message may include the MBS Identity to indicate that the requested bearer is related to which MBS.

In step S1015, upon the receipt of the modification request message, the gNB-CU-UP may transmit the Bearer Context Modification Response or new message to the gNB-CU-CP.

In step S1016, on receiving the modification response message from the gNB-CU-UP, the gNB-CU-CP may send the UE Context Modification Request or new message to the gNB-DU in order to request the setup of bearer (for example, data radio bearer or unicast bearer) for multicast/broadcast data transmission between the gNB-DU and the UE. This message may contain the MBS Identity to indicate that the requested bearer is related to which MBS.

In step S1017, when to receive the modification request message, the gNB-DU may respond with the UE Context Modification Response or new message including the configuration for requested bearer to the gNB-CU-CP.

In step S1018, upon the receipt of the message from the gNB-DU, the gNB-CU-CP may transmit the Bearer Context Modification Request or new message to the gNB-CU-UP. This message may contain the MBS Identity to indicate that the requested bearer is related to which MBS.

In step S1019, on receiving the message from the gNB-CU-CP, the gNB-CU-UP may respond with the Bearer Context Modification Response or new message.

For steps S1014 to S1019, if there are multiple UEs provided with the same MBS, steps S1014 to S1019 may be performed for each of that UE before step S1020 is proceeded.

In step S1020, when to receive the message from the gNB-CU-UP, the gNB-CU-CP may send the Transmission Type Change Request, existing, or new message to the gNB-CU-UP to request the change from multicast to unicast. This message may include the MBS Identity to indicate the MBS to be changed. In addition, this message may include the MRB Remove List with the MRB ID in order to request removal of MRB for the indicated MBS.

In step S1021, when to receive the message from the gNB-CU-CP, based on the received information, the gNB-CU-UP may remove the allocated resources for MRB related to the indicated MBS. Then, it may respond with the Transmission Type Change Response, existing, or new message to the gNB-CU-CP. This message may contain the MBS Identity to indicate the MBS to be changed from multicast to unicast.

In step S1022, in order to request the switching from multicast to unicast, the gNB-CU-CP may send the Transmission Switching Request, existing, or new message to the gNB-DU. This message may include the MBS Identity to indicate the MBS to be switched. In addition, this message may contain the Switching Indication to inform the gNB-DU of the multicast to unicast switching. This indication may be the MRB Remove List with the MRB ID.

In step S1023, on receiving the message from the gNB-CU-CP, based on the received information, the gNB-DU may remove the allocated radio resource for MRB related to the indicated MBS. Then, it may respond with the Transmission Switching Response, existing, or new message to the gNB-CU-CP. This message may include the MBS Identity to indicate the MBS to be switched from multicast to unicast.

In step S1024, when to receive the message from the gNB-DU, the gNB-CU-CP may transmit the DL RRC Message Transfer message containing the RRCReconfiguration with the configuration of bearer (for example, data radio bearer or unicast bearer) for multicast/broadcast data transmission to the gNB-DU.

In step S1025, the gNB-DU may send the UL RRC Message Transfer message to the gNB-CU-CP to forward the RRCReconfigurationComplete received from the UE.

Referring to FIGS. 10A and 10B, for example, a central unit (CU)-control plane (CP) of a RAN node (for example, a gNB) may perform the switching between unicast and multicast in a wireless communication system. The CU-CP of the RAN node may decide to perform switching from unicast to multicast for the MBS based on the number of RRC_CONNECTED UEs. The CU-CP of the RAN node may transmit, to a CU-UP and a DU of the RAN node, the request for the switching from unicast to multicast for the MBS. The CU-CP of the RAN node may receive, from the CU-UP, the response for acceptance of the request including established multicast radio bearer related information for the MBS. The CU-CP of the RAN node may receive, from the DU, the response for acceptance of the request including channel information for the MBS. The CU-CP of the RAN node may transmit, to the CU-UP, the request for joining the multicast group for the MB session. The CU-CP of the RAN node may receive, from the CU-UP, the response for complete of joining the multicast group for the MB session. The CU-CP of the RAN node may decide to perform switching from multicast to unicast for the MBS based on the number of RRC_CONNECTED UEs. The CU-CP of the RAN node may transmit, to the CU-UP and the DU, the request for the switching from multicast to unicast for the MBS. The CU-CP of the RAN node may receive, from the CU-UP and the DU, the response for acceptance of the request.

FIGS. 11A, 11B, 12A, and 12B show an example of a method for multicast and broadcast service in a wireless communication system.

For example, in FIGS. 11A, 11B, 12A, and 12B, a gNB-CU-CP may request the switching between multicast and unicast for the multicast/broadcast service (MBS) to a gNB-CU-UP and a gNB-DU based on the number of RRC_CONNECTED UEs during transmission of multicast data. Then, the gNB-CU-UP and the gNB-DU may respond acceptance for the request of the gNB-CU-CP considering their respective resource situation.

In case of unicast to multicast switching, the gNB-CU-UP and the gNB-DU may provide the gNB-CU-CP with a setup list of multicast radio bearer (MRB) for the MBS and the multicast/broadcast channel information for the MBS in order to offer this information to the UE(s) provided with the MBS respectively. Also, the gNB-CU-CP may provide the gNB-DU with the multicast/broadcast channel information for the MBS, which is generated based on a setup list of MRB for the MBS provided by the gNB-CU-UP.

In case of multicast to unicast switching, the gNB-CU-UP and the gNB-DU may remove the allocated resource for MRB related to the MBS based on a remove list of MRB provided by the gNB-CU-CP. In addition, the gNB-CU-CP may determine whether it provides unicast or multicast transmission for the MBS based on the number of RRC_CONNECTED UEs, and request joining the multicast group for the MBS to the gNB-CU-UP, when the AMF requests the MB session resource setup to start transmission of multicast data.

Figure 11B:
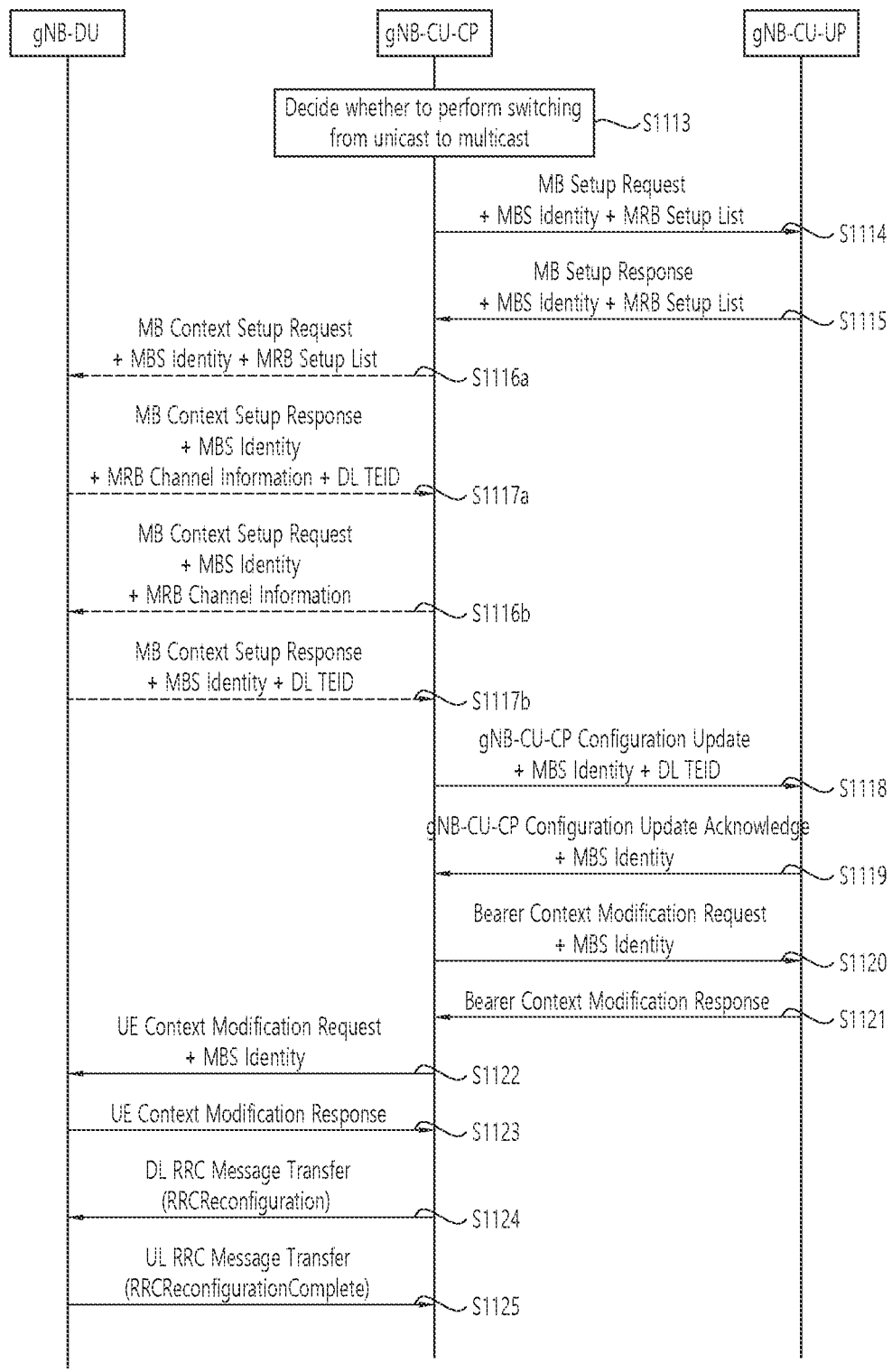

Referring to FIGS. 11A and 11B, FIG. 11A shows an example of a procedure for start of unicast transmission for the MBS. In addition, FIG. 11B shows an example of a procedure for switching from unicast to multicast for the MBS.

In step S1101, the AMF may send the MB Session Resource Setup Request, existing, or new message including the MBS Identity (for example, TMGI), low layer multicast (LL MC) address, and/or 5G Authorized QoS Profile to the gNB-CU-CP where CM CONNECTED UEs that has joined the TMGI resides.

In step S1102, on receiving the request message from the AMF, the gNB-CU-CP may create the MB session context for the received MBS Identity. Based on the number of RRC_CONNECTED UEs, the gNB-CU-CP may decide to perform unicast transmission for indicated MBS.

In step S1103, the gNB-CU-CP may send the Bearer Context Modification Request or new message to the gNB-CU-UP to request establishing the bearer (for example, data radio bearer or unicast bearer) for multicast/broadcast data transmission between the gNB-CU-UP and the gNB-DU. This message may include the MBS Identity to indicate that the requested bearer is related to which MBS.

In step S1104, upon the receipt of the modification request message, the gNB-CU-UP may establish the requested bearer for indicated MBS and transmit the Bearer Context Modification Response or new message to the gNB-CU-CP.

In step S1105, on receiving the modification response message from the gNB-CU-UP, the gNB-CU-CP may send the UE Context Modification Request or new message to the gNB-DU in order to request the setup of bearer (for example, data radio bearer or unicast bearer) for multicast/broadcast data transmission between the gNB-DU and the UE. This message may contain the MBS Identity to indicate that the requested bearer is related to which MBS.

In step S1106, when to receive the modification request message, the gNB-DU may respond with the UE Context Modification Response or new message including the configuration for requested bearer to the gNB-CU-CP.

In step S1107, upon the receipt of the message from the gNB-DU, the gNB-CU-CP may transmit the Bearer Context Modification Request or new message to the gNB-CU-UP. This message may contain the MBS Identity to indicate that the requested bearer is related to which MBS. This message may include the Join Request Indication and/or the LL MC address so that the gNB-CU-UP joins the multicast group for indicated MBS.

In step S1108, on receiving the message from the gNB-CU-CP, the gNB-CU-UP may perform the MLD/IGMP Join for the MBS indicated by the MBS Identity along with the MB-UPF. If the gNB-CU-UP receives multiple Bearer Context Modification Request messages including the Join Request Indication and/or the LL MC address, the gNB-CU-UP may perform the MLD/IGMP Join once.

In step S1109, the gNB-CU-UP may respond with the Bearer Context Modification Response or new message. This message may include the Join Complete Indication to inform the gNB-CU-CP that joining the multicast group for the MBS is completed.

In step S1110, when to receive the message from the gNB-CU-UP, the gNB-CU-CP may transmit the DL RRC Message Transfer message with the RRCReconfiguration to the gNB-DU in order to provide the UE with the information related to bearer established for the MBS.

In step S1111, the gNB-DU may send the UL RRC Message Transfer message to the gNB-CU-CP to forward the RRCReconfigurationComplete received from the UE.

For steps S1103 to S1111, if there are multiple UEs provided with the same MBS, steps S1103 to S1111 may be performed for each of that UE before step S1112 is proceeded.

In step S1112, the gNB-CU-CP may report successful establishment of the MB session resource by sending MB Session Resource Setup Response, existing, or new message including the MBS Identity to the AMF.

In step S1113, during transmission of multicast data, based on the number of RRC_CONNECTED UEs, the gNB-CU-CP may decide to perform switching from unicast to multicast.

In step S1114, the gNB-CU-CP may send the MB Setup Request, existing, or new message to the gNB-CU-UP to request the setup of bearer for multicast/broadcast data transmission between the gNB-CU-UP and the gNB-DU. This message may include the MBS Identity to indicate that the requested bearer is related to which MBS. Also, this message may include the multicast radio bearer (MRB) Setup List with the MRB ID, the SDAP/PDCP configurations, and/or the QoS flow related information in order to request setup of MRB for the indicated MBS.

In step S1115, upon the receipt of the request message, the gNB-CU-UP may check whether to be able to allocate the requested MRB resources for the MBS. If available, it may respond with the MB Setup Response, existing, or new message to the gNB-CU-CP. This message may contain the MBS Identity and MRB Setup List to provide the information related to the MRB resources established for the indicated MBS.

According to which node manages the MRB, there are two options as below.

Option a: gNB-DU

In step S1116a, in order to request the setup of MRB to the gNB-DU, the gNB-CU-CP may send the MB Context Setup Request, existing, or new message to the gNB-DU. This message may include the MBS Identity to indicate the MBS to be established. In addition, this message may contain the MRB Setup List with the MRB ID, and/or the QoS flow related information.

In step S1117a, on receiving the message from the gNB-CU-CP, the gNB-DU may check whether to be able to allocate the radio resource for MRB related to the indicated MBS. If available, it may respond with the MB Context Setup Response, existing, or new message to the gNB-CU-CP. This message may include the MBS Channel Information and the MBS Identity to be provided to the UE(s) which joins the indicated MBS. In addition, this message may include the downlink tunnel endpoint (DL TEID) for multicast/broadcast data transmission from the gNB-CU-UP to the gNB-DU.

Option b: gNB-CU-CP

In step S1116b, in order for the gNB-DU to be able to setup the MRB, the gNB-CU-CP may send the MB Context Setup Request, existing, or new message to the gNB-DU. This message may include the MBS Identity to indicate the MBS to be established. In addition, this message may contain the MBS Channel Information which the gNB-CU-CP generates based on the MRB Setup List received in step S1115 in order to provide multicast channel information to the UEs which join the indicated MBS.

In step S1117b, on receiving the message from the gNB-CU-CP, the gNB-DU may store the MBS Identity and the MBS Channel Information, and uses this information for transmission of multicast data (for example, broadcast the MBS Channel Information). The gNB-DU may respond with the MB Context Setup Response, existing, or new message to the gNB-CU-CP. This message may include the MBS Identity and the DL TEID for multicast/broadcast data transmission from the gNB-CU-UP to the gNB-DU.

In step S1118, upon the receipt of the message from the gNB-DU, the gNB-CU-CP may send the gNB-CU-CP Configuration Update or new message with the DL TEID to the gNB-CU-UP in order to indicate DL TEID to be used for multicast/broadcast data transmission from the gNB-CU-UP to the gNB-DU. This message may contain the MBS Identity to indicate that the requested bearer is related to which MBS.

In step S1119, when to receive the message from the gNB-CU-CP, the gNB-CU-UP may store the MBS Identity and the DL TEID, and use this information to transmit the multicast data arrived for stored MBS to the gNB-DU. The gNB-CU-UP may respond with the gNB-CU-CP Configuration Update Acknowledge or new message. This message may include the MBS Identity to indicate that the requested bearer is related to which MBS.

In step S1120, the gNB-CU-CP may send the Bearer Context Modification Request or new message to the gNB-CU-UP to request the release of bearer (for example, data radio bearer or unicast bearer) established for multicast/broadcast data transmission between the gNB-CU-UP and the gNB-DU. This message may include the MBS Identity to indicate that the requested bearer is related to which MBS.

In step S1121, upon the receipt of the modification request message, the gNB-CU-UP may release the requested bearer and then transmit the Bearer Context Modification Response or new message to the gNB-CU-CP.

In step S1122, on receiving the modification response message from the gNB-CU-UP, the gNB-CU-CP may send the UE Context Modification Request or new message to the gNB-DU in order to request the release of bearer (for example, data radio bearer or unicast bearer) established for multicast/broadcast data transmission between the gNB-DU and the UE. This message may contain the MBS Identity to indicate that the requested bearer is related to which MBS.

In step S1123, when to receive the modification request message, the gNB-DU may release the requested bearer and then responds with the UE Context Modification Response or new message to the gNB-CU-CP.

In step S1124, when to receive the message from the gNB-DU, the gNB-CU-CP may transmit the DL RRC Message Transfer message with the RRCReconfiguration to the gNB-DU in order to provide the UE with the information related to released bearer.

In step S1125, the gNB-DU may send the UL RRC Message Transfer message to the gNB-CU-CP to forward the RRCReconfigurationComplete received from the UE.

Figure 12A:
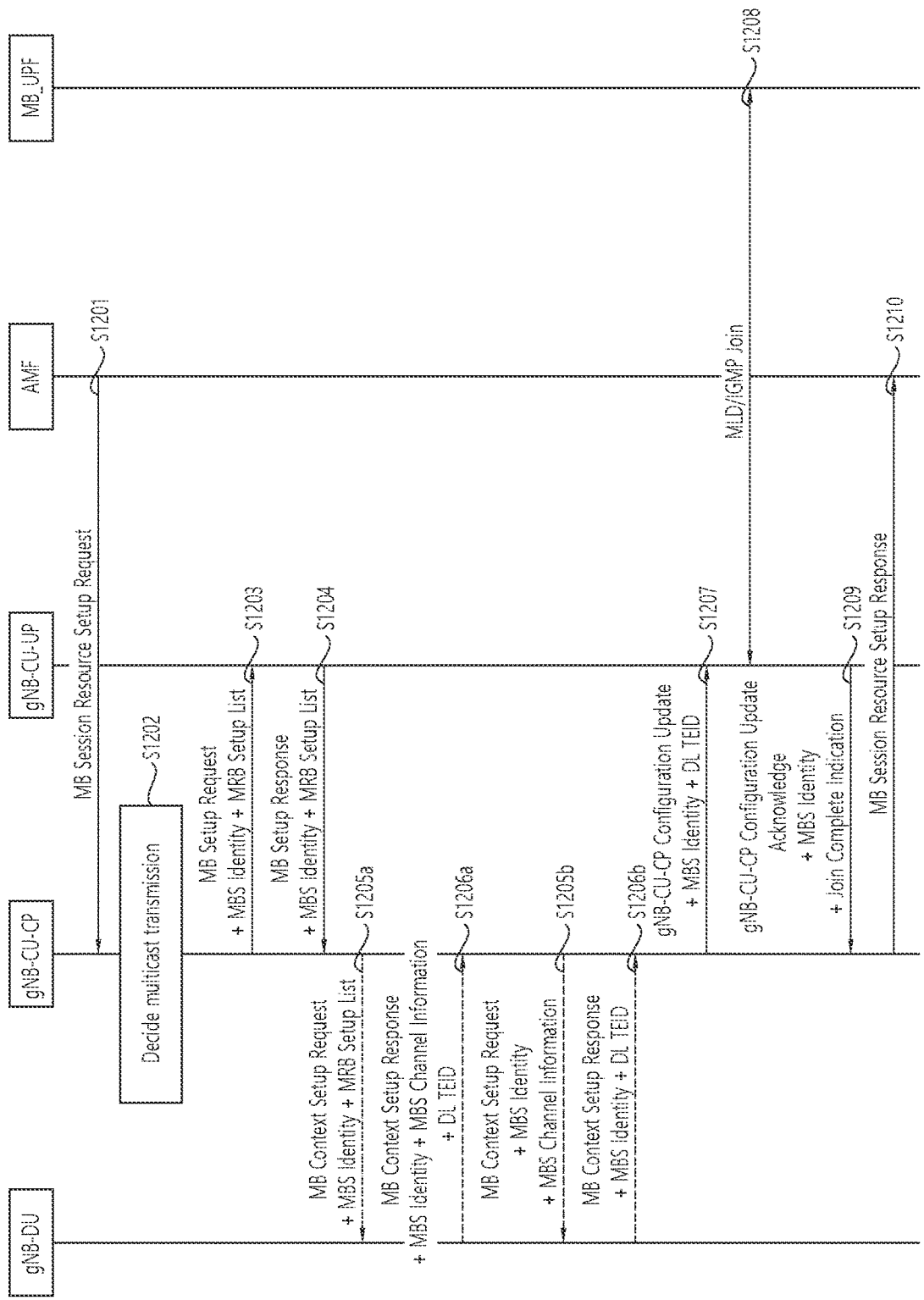
Figure 12B:
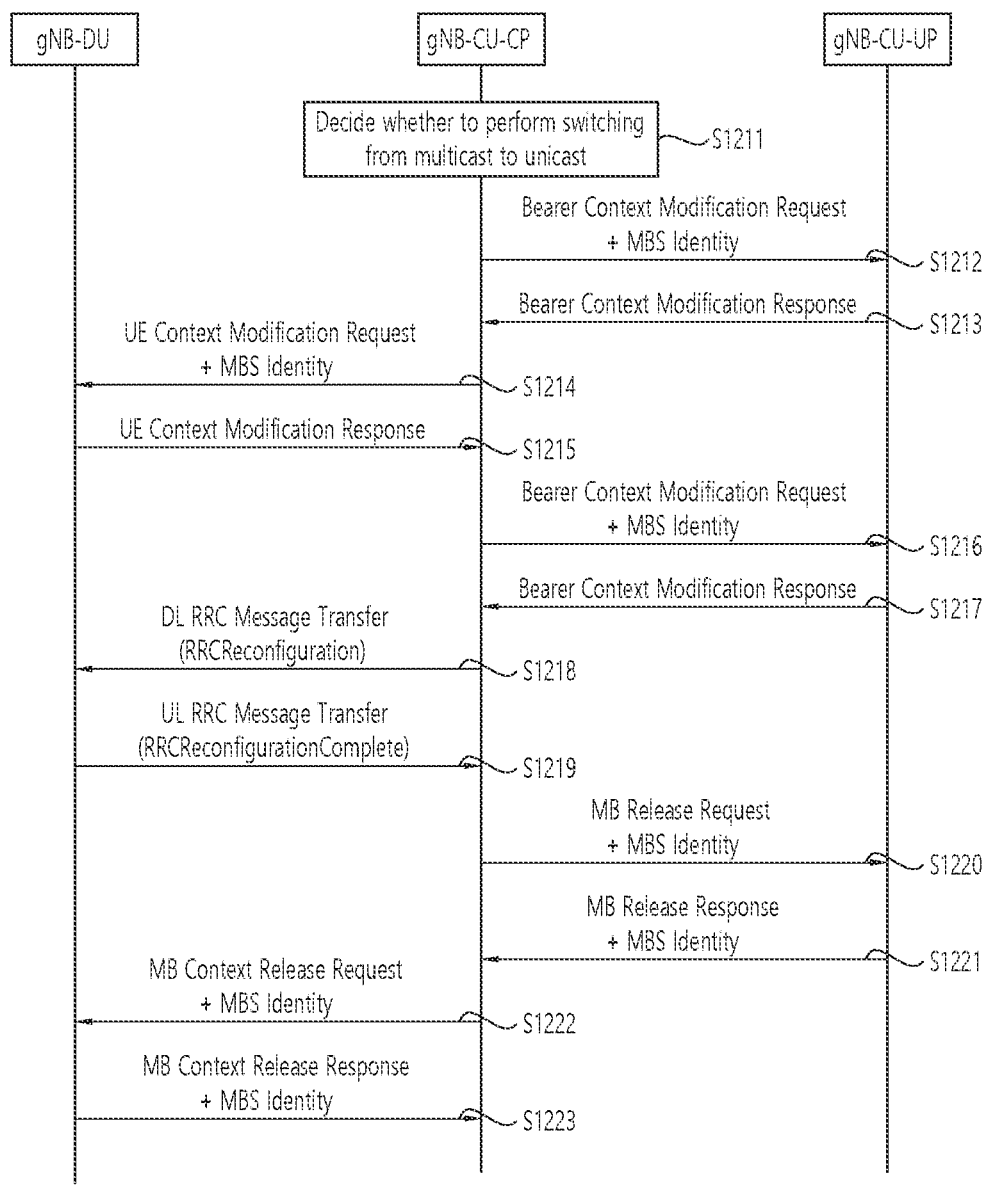

Referring to FIGS. 12A and 12B, FIG. 12A shows an example of a procedure for Start of multicast transmission for the MBS. In addition, FIG. 12B shows an example of a procedure for switching from multicast to unicast for the MBS.

In step S1201, the AMF may send the MB Session Resource Setup Request, existing, or new message including the MBS Identity (for example, TMGI), low layer multicast (LL MC) address, and/or 5G Authorized QoS Profile to the gNB-CU-CP where CM CONNECTED UEs that has joined the TMGI resides.

In step S1202, on receiving the request message from the AMF, the gNB-CU-CP may create the MB session context for the received MBS Identity. Based on the number of RRC_CONNECTED UEs, the gNB-CU-CP may decide to perform multicast transmission for indicated MBS.

In step S1203, the gNB-CU-CP may send the MB Setup Request, existing, or new message to the gNB-CU-UP to request the setup of bearer for multicast/broadcast data transmission between the gNB-CU-UP and the gNB-DU. This message may include the MBS Identity to indicate that the requested bearer is related to which MBS. Also, this message may include the multicast radio bearer (MRB) Setup List with the MRB ID, the SDAP/PDCP configurations, and/or the QoS flow related information in order to request setup of MRB for the indicated MBS.

In step S1204, upon the receipt of the request message, the gNB-CU-UP may check whether to be able to allocate the requested MRB resources for the MBS. If available, it may respond with the MB Setup Response, existing, or new message to the gNB-CU-CP. This message may contain the MBS Identity and MRB Setup List to provide the information related to the MRB resources established for the indicated MBS.

According to which node manages the MRB, there are two options as below.

Option a: gNB-DU

In step S1205a, in order to request the setup of MRB to the gNB-DU, the gNB-CU-CP may send the MB Context Setup Request, existing, or new message to the gNB-DU. This message may include the MBS Identity to indicate the MBS to be established. In addition, this message may contain the MRB Setup List with the MRB ID, and/or the QoS flow related information.

In step S1206a, on receiving the message from the gNB-CU-CP, the gNB-DU may check whether to be able to allocate the radio resource for MRB related to the indicated MBS. If available, it may respond with the MB Context Setup Response, existing, or new message to the gNB-CU-CP. This message may include the MBS Channel Information and the MBS Identity to be provided to the UE(s) which joins the indicated MBS. In addition, this message may include the downlink tunnel endpoint (DL TEID) for multicast/broadcast data transmission from the gNB-CU-UP to the gNB-DU.

Option b: gNB-CU-CP

In step S1205b, in order for the gNB-DU to be able to setup the MRB, the gNB-CU-CP may send the MB Context Setup Request, existing, or new message to the gNB-DU. This message may include the MBS Identity to indicate the MBS to be established. In addition, this message may contain the MBS Channel Information which the gNB-CU-CP generates based on the MRB Setup List received in step S1204 in order to provide multicast channel information to the UEs which join the indicated MBS.

In step S1206b, on receiving the message from the gNB-CU-CP, the gNB-DU may store the MBS Identity and the MBS Channel Information, and use this information for transmission of multicast data (for example, broadcast the MBS Channel Information). The gNB-DU may respond with the MB Context Setup Response, existing, or new message to the gNB-CU-CP. This message may include the MBS Identity and the DL TEID for multicast/broadcast data transmission from the gNB-CU-UP to the gNB-DU.

In step S1207, upon the receipt of the message from the gNB-DU, the gNB-CU-CP may transmit the gNB-CU-CP Configuration Update or new message with the DL TEID to the gNB-CU-UP in order to indicate DL TEID to be used for multicast/broadcast data transmission from the gNB-CU-UP to the gNB-DU. This message may contain the MBS Identity to indicate that the requested bearer is related to which MBS. This message may include the Join Request Indication and/or the LL MC address so that the gNB-CU-UP joins the multicast group for indicated MBS.

In step S1208, on receiving the message from the gNB-CU-CP, the gNB-CU-UP may perform the MLD/IGMP Join for the MBS indicated by the MBS Identity along with the MB-UPF. Also, it may store the MBS Identity and the DL TEID, and use this information to transmit the multicast data arrived for stored MBS to the gNB-DU.

In step S1209, the gNB-CU-UP may respond with the gNB-CU-CP Configuration Update Acknowledge or new message. This message may include the MBS Identity to indicate that the requested bearer is related to which MBS. This message may include the Join Complete Indication to inform the gNB-CU-CP that joining the multicast group for the MBS is completed.

In step S1210, the gNB-CU-CP may report successful establishment of the MB session resource by sending MB Session Resource Setup Response, existing, or new message including the MBS Identity to the AMF.

In step S1211, during transmission of multicast data, based on the number of RRC_CONNECTED UEs, the gNB-CU-CP may decide to perform switching from multicast to unicast.

In step S1212, the gNB-CU-CP may send the Bearer Context Modification Request or new message to the gNB-CU-UP to request establishing the bearer (for example, data radio bearer or unicast bearer) for multicast/broadcast data transmission between the gNB-CU-UP and the gNB-DU. This message may include the MBS Identity to indicate that the requested bearer is related to which MBS.

In step S1213, upon the receipt of the modification request message, the gNB-CU-UP may establish the requested bearer for indicated MBS and transmit the Bearer Context Modification Response or new message to the gNB-CU-CP.

In step S1214, on receiving the modification response message from the gNB-CU-UP, the gNB-CU-CP may send the UE Context Modification Request or new message to the gNB-DU in order to request the setup of bearer (for example, data radio bearer or unicast bearer) for multicast/broadcast data transmission between the gNB-DU and the UE. This message may contain the MBS Identity to indicate that the requested bearer is related to which MBS.

In step S1215, when to receive the modification request message, the gNB-DU may respond with the UE Context Modification Response or new message including the configuration for requested bearer to the gNB-CU-CP.

In step S1216, upon the receipt of the message from the gNB-DU, the gNB-CU-CP may transmit the Bearer Context Modification Request or new message to the gNB-CU-UP. This message may contain the MBS Identity to indicate that the requested bearer is related to which MBS.

In step S1217, the gNB-CU-UP may respond with the Bearer Context Modification Response or new message.

In step S1218, when to receive the message from the gNB-CU-UP, the gNB-CU-CP may transmit the DL RRC Message Transfer message with the RRCReconfiguration to the gNB-DU in order to provide the UE with the information related to bearer established for the MBS.

In step S1219, the gNB-DU may send the UL RRC Message Transfer message to the gNB-CU-CP to forward the RRCReconfigurationComplete received from the UE.

For steps S1212 to S1219, if there are multiple UEs provided with the same MBS, steps S1212 to S1219 may be performed for each of that UE before step S1220 is proceeded.

In step S1220, the gNB-CU-CP may send the MB Release Request, existing, or new message to the gNB-CU-UP to request the release of bearer established for multicast/broadcast data transmission between the gNB-CU-UP and the gNB-DU. This message may include the MBS Identity to indicate release of bearer for the indicated MBS.

In step S1221, upon the receipt of the request message, the gNB-CU-UP may release the requested bearer and transmits the MB Release Response or new message to the gNB-CU-CP. This message may include the MBS Identity to indicate that the released bearer is related to which MBS.

In step S1222, on receiving the response message from the gNB-CU-UP, the gNB-CU-CP may send the MB Context Release Request or new message to the gNB-DU in order to request the release of MRB established for multicast/broadcast data transmission between the gNB-DU and the UE. This message may contain the MBS Identity to indicate that the requested bearer is related to which MBS.

In step S1223, when to receive the request message, the gNB-DU may release the MRB and responds with the MB Context Release Response or new message to the gNB-CU-CP. This message may include the MBS Identity to indicate that the released MRB is related to which MBS.

Referring to FIGS. 11A, 11B, 12A, and 12B, for example, a CU-CP of a gNB may perform the switching between unicast and multicast in a wireless communication system. The CU-CP may decide to perform unicast transmission based on the number of RRC_CONNECTED UEs. The CU-CP may transmit, to the CU-UP of the gNB and the DU of the gNB, the request for establishing the unicast radio bearer for the MBS. The CU-CP may receive, from the CU-UP, the response for acceptance of the request including established unicast radio bearer related information for the MBS. The CU-CP may receive, from the DU, the response for acceptance of the request including channel information for the MBS. The CU-CP may transmit, to the CU-UP, the request for joining the multicast group for the MBS. The CU-CP may receive, from the CU-UP, the response for complete of joining the multicast group for the MBS. The CU-CP may decide to perform switching from unicast to multicast for the MBS based on the number of RRC_CONNECTED UEs. The CU-CP may transmit, to the CU-UP and the DU, the request for establishing the multicast radio bearer for the MBS. The CU-CP may receive, from the CU-UP, the response for acceptance of the request including established multicast radio bearer related information for the MBS. The CU-CP may receive, from the DU, the response for acceptance of the request including channel information for the MBS. The CU-CP may transmit, to the CU-UP and the DU, the request for release the established unicast radio bearer for the MBS.

Hereinafter, an apparatus for multicast and broadcast service in a wireless communication system, according to some embodiments of the present disclosure, will be described.

For example, a Central Unit (CU)-User Plane (UP) of a Radio Access Network (RAN) node may include a processor, and a memory. For example, referring to FIG. 7, a gNB-CU could be an example of the CU of a RAN node, according to some embodiments of the present disclosure. For example, the gNB-CU may include a gNB-CU-CP and a gNB-CU-UP.

According to some embodiments of the present disclosure, the processor may be configured to be coupled operably with the memory.

The processor may be configured to receive, from a CU-Control Plane (CP) of the RAN node, a first message to join a multicast group for a Multicast and/or Broadcast (MB) service. The first message may include (1) an identity for the MB service, (2) a Join Request Indication, and (3) a low layer multicast (LL MC) address for the MB service which is provided by an Access and Mobility management Function (AMF). The processor may be configured to perform the Multicast Listener Discovery (MLD) and/or Internet Group Management Protocol (IGMP) Join procedure for the MB service indicated by the identity for the MB service along with an MB-User Plane Function (UPF) based on the LL MC address. The processor may be configured to transmit, to the CU-CP of the RAN node, a second message including a Join Complete Indication informing that joining the multicast group for the MB service is completed.

For example, the MLD and/or IGMP Join procedure may include joining the multicast group for a MB session indicated by the identity for the MB service.

For example, the first message may be a CU-CP Configuration Update message.

For example, wherein the second message may be a CU-CP Configuration Update Acknowledge message.

For example, the first message may include a Downlink (DL) Tunnel Endpoint Identifier (TEID) for the MB service.

For example, the TEID may be used for data transmission for the MB service from the CU-UP to a Distributed Unit (DU) of the RAN node.

For example, the processor may be configured to receive, from the CU-CP, a third message to request setup of a bearer for the MB service between the CU-UP and a Distributed Unit of the RAN node.

For example, the third message may include the identity for the MB service to indicate that the bearer is related to the MB service.

For example, the third message may include (1) a multicast radio bearer (MRB) Setup List for the MB service, (2) Service Data Adaptation Protocol (SDAP) configuration for the MB service, (3) Packet Data Convergence Protocol (PDCP) configurations for the MB service, and/or (4) information on a Quality of Service (QoS) flow for the MB service.

For example, the processor may be configured to determine that a resource for the bearer is available. The processor may be configured to establish the bearer for the MB service. The processor may be configured to transmit, to the CU-CP, a fourth message to inform that the bearer is established.

For example, the fourth message may include (1) the identity for the MB service to indicate the bearer, and (2) information on the resource for the bearer.

Hereinafter, a processor for a Central Unit (CU)-User Plane (UP) for multicast and broadcast service in a wireless communication system, according to some embodiments of the present disclosure, will be described.

The processor may be configured to control the CU-UP to receive, from a CU-Control Plane (CP) of the RAN node, a first message to join a multicast group for a Multicast and/or Broadcast (MB) service. The first message may include (1) an identity for the MB service, (2) a Join Request Indication, and (3) a low layer multicast (LL MC) address for the MB service which is provided by an Access and Mobility management Function (AMF). The processor may be configured to control the CU-UP to perform the Multicast Listener Discovery (MLD) and/or Internet Group Management Protocol (IGMP) Join procedure for the MB service indicated by the identity for the MB service along with an MB-User Plane Function (UPF) based on the LL MC address. The processor may be configured to control the CU-UP to transmit, to the CU-CP of the RAN node, a second message including a Join Complete Indication informing that joining the multicast group for the MB service is completed.

For example, the MLD and/or IGMP Join procedure may include joining the multicast group for a MB session indicated by the identity for the MB service.

For example, the first message may be a CU-CP Configuration Update message.

For example, wherein the second message may be a CU-CP Configuration Update Acknowledge message.

For example, the first message may include a Downlink (DL) Tunnel Endpoint Identifier (TEID) for the MB service.

For example, the TEID may be used for data transmission for the MB service from the CU-UP to a Distributed Unit (DU) of the RAN node.

For example, the processor may be configured to control the CU-UP to receive, from the CU-CP, a third message to request setup of a bearer for the MB service between the CU-UP and a Distributed Unit of the RAN node.

For example, the third message may include the identity for the MB service to indicate that the bearer is related to the MB service.

For example, the third message may include (1) a multicast radio bearer (MRB) Setup List for the MB service, (2) Service Data Adaptation Protocol (SDAP) configuration for the MB service, (3) Packet Data Convergence Protocol (PDCP) configurations for the MB service, and/or (4) information on a Quality of Service (QoS) flow for the MB service.

For example, the processor may be configured to control the CU-UP to determine that a resource for the bearer is available. The processor may be configured to control the CU-UP to establish the bearer for the MB service. The processor may be configured to control the CU-UP to transmit, to the CU-CP, a fourth message to inform that the bearer is established.

For example, the fourth message may include (1) the identity for the MB service to indicate the bearer, and (2) information on the resource for the bearer.

Hereinafter, a non-transitory computer-readable medium has stored thereon a plurality of instructions for multicast and broadcast service in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a Central Unit (CU).

The stored a plurality of instructions may cause the CU-UP to receive, from a CU-Control Plane (CP) of the RAN node, a first message to join a multicast group for a Multicast and/or Broadcast (MB) service. The first message may include (1) an identity for the MB service, (2) a Join Request Indication, and (3) a low layer multicast (LL MC) address for the MB service which is provided by an Access and Mobility management Function (AMF). The stored a plurality of instructions may cause the CU-UP to perform the Multicast Listener Discovery (MLD) and/or Internet Group Management Protocol (IGMP) Join procedure for the MB service indicated by the identity for the MB service along with an MB-User Plane Function (UPF) based on the LL MC address. The stored a plurality of instructions may cause the CU-UP to transmit, to the CU-CP of the RAN node, a second message including a Join Complete Indication informing that joining the multicast group for the MB service is completed.

For example, the MLD and/or IGMP Join procedure may include joining the multicast group for a MB session indicated by the identity for the MB service.

For example, the first message may be a CU-CP Configuration Update message.

For example, wherein the second message may be a CU-CP Configuration Update Acknowledge message.

For example, the first message may include a Downlink (DL) Tunnel Endpoint Identifier (TEID) for the MB service.

For example, the TEID may be used for data transmission for the MB service from the CU-UP to a Distributed Unit (DU) of the RAN node.

For example, the stored a plurality of instructions may cause the CU-UP to receive, from the CU-CP, a third message to request setup of a bearer for the MB service between the CU-UP and a Distributed Unit of the RAN node.

For example, the third message may include the identity for the MB service to indicate that the bearer is related to the MB service.

For example, the third message may include (1) a multicast radio bearer (MRB) Setup List for the MB service, (2) Service Data Adaptation Protocol (SDAP) configuration for the MB service, (3) Packet Data Convergence Protocol (PDCP) configurations for the MB service, and/or (4) information on a Quality of Service (QoS) flow for the MB service.

For example, the stored a plurality of instructions may cause the CU-UP to determine that a resource for the bearer is available. The stored a plurality of instructions may cause the CU-UP to establish the bearer for the MB service. The stored a plurality of instructions may cause the CU-UP to transmit, to the CU-CP, a fourth message to inform that the bearer is established.

For example, the fourth message may include (1) the identity for the MB service to indicate the bearer, and (2) information on the resource for the bearer.

The present disclosure may have various advantageous effects.

According to some embodiments of the present disclosure, a Radio Access Network (RAN) node (for example, a base station such as an eNB or a gNB) could efficiently provide a multicast and broadcast service.

For example, gNB-CU-CP, the gNB-CU-UP, and the gNB-DU could properly perform switching between unicast and multicast for an MBS based on a number of RRC_CONNECTED UEs, resource status in the gNB-CU-UP, and gNB-DU's radio situation. Therefore, the resource for multicast and/or broadcast could be used efficiently. In addition, a wireless communication system could avoid the degradation of UE's experience by switching between unicast and multicast in a gNB.

For example, a RAN node could efficiently perform MLD and/or IGMP Join procedure with an MB-UPF. Therefore, the RAN node could efficiently provide a multicast and/or broadcast service.

For example, a CU-UP of a RAN node could transmit broadcast and/or multicast service data to a DU of the RAN node without loss, based on information provided by a CU-CP of the RAN node. Therefore, UEs receiving the multicast and/or broadcast service from the DU could avoid to be degraded.

For example, a CU-CP of a RNA node could provide information to a CU-UP of the RAN node to join a specific multicast service. Therefore, the CU-UP could receive data related to the specific multicast service efficiently.

For example, a CU-UP of a RAN node could receive information on IP multicast transport for the multicast service from the CN via a CU-CP of the RAN node. Therefore, the CU-UP could receive data related to the multicast service using the received information.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising,
receiving, by a Central Unit (CU)-User Plane (UP) of a Radio Access Network (RAN) node from a CU-Control Plane (CP) of the RAN node, a setup request message,
wherein the setup request message requests bearer setup for a multicast and/or broadcast service, and
wherein the multicast and/or broadcast setup request message includes (1) an identity for the multicast and/or broadcast service, (2) a multicast radio bearer setup list related to one or more multicast radio bearers to be setup between the CU-CP and the CU-UP for the multicast and/or broadcast service, (3) Service Data Adaptation Protocol (SDAP) configuration for the multicast and/or broadcast service, (4) Packet Data Convergence Protocol (PDCP) configuration for the multicast and/or broadcast service, and (5) information related to quality of service (QOS) flow for setup the one or more multicast radio bearers;
configuring, by the CU-UP, one or more multicast radio bearers based on whether resources for the one or more multicast radio bearers are available or not;
transmitting, by the CU-UP to the CU-CP, a setup response message,
wherein the setup response message includes information related to radio resources for setup the one or more multicast radio bearers;
receiving, by the CU-UP from the CU-CP, a CU-CP configuration update message,
wherein the CU-CP configuration update message is a message for joining a multicast group for a multicast and/or broadcast service, and
wherein the CU-CP configuration update message includes (1) the identity for the multicast and/or broadcast service, (2) a Join Request Indication, (3) a low layer multicast (LL MC) address for the multicast and/or broadcast service which is provided by an Access and Mobility management Function (AMF), and (4) information related to downlink (DL) Tunnel Endpoint Identifier (TEID) for data transmission for the multicast and/or broadcast service;
performing, by the CU-UP, the Multicast Listener Discovery (MLD) and/or Internet Group Management Protocol (IGMP) Join procedure for the multicast and/or broadcast service indicated by the identity for the multicast and/or broadcast service along with an multicast and/or broadcast-User Plane Function (UPF) based on the LL MC address; and transmitting, by the CU-UP to the CU-CP of the RAN node, a CU-CP configuration update acknowledge message, wherein the CU-CP configuration update acknowledge message includes a Join Complete Indication informing that joining the multicast group for the multicast and/or broadcast service is completed and the identity for the multicast and/or broadcast service;

wherein the MLD and/or IGMP Join procedure includes joining the multicast group for multicast and/or broadcast session indicated by the identifier for the multicast and/or broadcast service, and wherein the TEID is used for data transmission for the multicast and/or broadcast service from the CU-UP to the Distributed Unit (DU) of the RAN node.

2. A Central Unit (CU)-User Plane (UP) of a Radio Access Network (RAN) node, comprising:

a memory; and at least one processor operatively coupled to the memory, and adapted to perform operations, the operations comprising:

receiving, from a CU-Control Plane (CP) of the RAN node, a setup request message, wherein the setup request message requests bearer setup for a multicast and/or broadcast service, and wherein the multicast and/or broadcast setup request message includes (1) an identity for the multicast and/or broadcast service, (2) a multicast radio bearer setup list related to one or more multicast radio bearers to be setup between the CU-CP and the CU-UP for the multicast and/or broadcast service, (3) Service Data Adaptation Protocol (SDAP) configuration for the multicast and/or broadcast service, (4) Packet Data Convergence Protocol (PDCP) configuration for the multicast and/or broadcast service, and (5) information related to quality of service (QOS) flow for setup the one or more multicast radio bearers;

configuring one or more multicast radio bearers based on whether resources for the one or more multicast radio bearers are available or not;

transmitting, to the CU-CP, a setup response message, wherein the setup response message includes information related to radio resources for setup the one or more multicast radio bearers;

receiving, from the CU-CP, a CU-CP configuration update message, wherein the CU-CP configuration update message is a message for joining a multicast group for a multicast and/or broadcast service, and wherein the CU-CP configuration update message includes (1) the identity for the multicast and/or broadcast service, (2) a Join Request Indication, (3) a low layer multicast (LL MC) address for the multicast and/or broadcast service which is provided by an Access and Mobility management Function (AMF), and (4) information related to downlink (DL) Tunnel Endpoint Identifier (TEID) for data transmission for the multicast and/or broadcast service;

performing the Multicast Listener Discovery (MLD) and/or Internet Group Management Protocol (IGMP) Join procedure for the multicast and/or broadcast service indicated by the identity for the multicast and/or broadcast service along with an multicast and/or broadcast-User Plane Function (UPF) based on the LL MC address; and transmitting, to the CU-CP of the RAN node, a CU-CP configuration update acknowledge message, wherein the CU-CP configuration update acknowledge message includes a Join Complete Indication informing that joining the multicast group for the multicast and/or broadcast service is completed and the identity for the multicast and/or broadcast service;

wherein the MLD and/or IGMP Join procedure includes joining the multicast group for multicast and/or broadcast session indicated by the identifier for the multicast and/or broadcast service, and wherein the TEID is used for data transmission for the multicast and/or broadcast service from the CU-UP to the Distributed Unit (DU) of the RAN node.

3. A non-transitory computer-readable medium having stored thereon a plurality of instructions, which, when executed by a processor of a Central Unit (CU)-User Plane (UP) of a Radio Access Network (RAN) node in a wireless communication system, cause the CU-UP of the RAN node to perform operations, the operations comprising:

receiving, from a CU-Control Plane (CP) of the RAN node, a setup request message, wherein the setup request message requests bearer setup for a multicast and/or broadcast service, and wherein the multicast and/or broadcast setup request message includes (1) an identity for the multicast and/or broadcast service, (2) a multicast radio bearer setup list related to one or more multicast radio bearers to be setup between the CU-CP and the CU-UP for the multicast and/or broadcast service, (3) Service Data Adaptation Protocol (SDAP) configuration for the multicast and/or broadcast service, (4) Packet Data Convergence Protocol (PDCP) configuration for the multicast and/or broadcast service, and (5) information related to quality of service (QOS) flow for setup the one or more multicast radio bearers;

configuring one or more multicast radio bearers based on whether resources for the one or more multicast radio bearers are available or not;

transmitting, to the CU-CP, a setup response message, wherein the setup response message includes information related to radio resources for setup the one or more multicast radio bearers;

receiving, from the CU-CP, a CU-CP configuration update message, wherein the CU-CP configuration update message is a message for joining a multicast group for a multicast and/or broadcast service, and wherein the CU-CP configuration update message includes (1) the identity for the multicast and/or broadcast service, (2) a Join Request Indication, (3) a low layer multicast (LL MC) address for the multicast and/or broadcast service which is provided by an Access and Mobility management Function (AMF), and (4) information related to downlink (DL) Tunnel Endpoint Identifier (TEID) for data transmission for the multicast and/or broadcast service;

performing the Multicast Listener Discovery (MLD) and/or Internet Group Management Protocol (IGMP) Join procedure for the multicast and/or broadcast service indicated by the identity for the multicast and/or broadcast service along with an multicast and/or broadcast-User Plane Function (UPF) based on the LL MC address; and transmitting, to the CU-CP of the RAN node, a CU-CP configuration update acknowledge message, wherein the CU-CP configuration update acknowledge message includes a Join Complete Indication informing that joining the multicast group for the multicast and/or broadcast service is completed and the identity for the multicast and/or broadcast service;

wherein the MLD and/or IGMP Join procedure includes joining the multicast group for multicast and/or broadcast session indicated by the identifier for the multicast and/or broadcast service, and wherein the TEID is used for data transmission for the multicast and/or broadcast service from the CU-UP to the Distributed Unit (DU) of the RAN node.

* * * * *